United States Patent
Goodman et al.

(10) Patent No.: US 12,478,313 B2
(45) Date of Patent: Nov. 25, 2025

(54) SYSTEM AND METHOD FOR PERFORMING ASSESSMENTS BASED ON ORTHOSTATIC MEASUREMENTS

(71) Applicant: Vital Sines International Inc., Mississauga (CA)

(72) Inventors: Jesse B. Goodman, Mississauga (CA); Benoit Lewden, Calgary (CA)

(73) Assignee: Vital Sines International Inc., Mississauga (CA)

( * ) Notice: Subject to any disclaimer, the term of this patent is extended or adjusted under 35 U.S.C. 154(b) by 451 days.

(21) Appl. No.: 18/121,460

(22) Filed: Mar. 14, 2023

(65) Prior Publication Data
US 2023/0284963 A1    Sep. 14, 2023

Related U.S. Application Data

(60) Provisional application No. 63/319,638, filed on Mar. 14, 2022.

(51) Int. Cl.
*A61B 5/02*    (2006.01)
*A61B 5/00*    (2006.01)
*A61B 5/021*    (2006.01)

(52) U.S. Cl.
CPC ........ *A61B 5/4076* (2013.01); *A61B 5/02116* (2013.01); *A61B 5/4035* (2013.01); *A61B 5/7278* (2013.01); *A61B 5/743* (2013.01)

(58) Field of Classification Search
None
See application file for complete search history.

(56) References Cited

U.S. PATENT DOCUMENTS

2020/0085312 A1*    3/2020    Tzvieli ............... A61B 5/02055

OTHER PUBLICATIONS

Mora et al. Cerebral autoregulation and symptoms of orthostatic hypotension in familial dysautonomia. J Cereb Blood Flow Metab. Jul. 2017;37(7):2414-2422. (Year: 2017).*
Romano et al. Beat-to-beat analysis of pressure wave morphology for pre-symptomatic detection of orthostatic intolerance during head-up tilt. J Am Coll Cardiol. Nov. 2, 2004;44(9):1891-7. (Year: 2004).*

(Continued)

*Primary Examiner* — Ankit D Tejani
(74) *Attorney, Agent, or Firm* — SMART & BIGGAR LP; Tonino Rosario Orsi

(57) ABSTRACT

Methods, devices and systems are described for evaluating an initial orthostatic response of an individual during an orthostatic test. For example, the method may include: receiving a pulse signal obtained during an orthostatic test performed from a sensor placed on the individual; identifying a position and an amplitude of the dicrotic notch for pulses in a portion of the pulse signal to obtain a set of dicrotic notch positions and amplitudes; generating an initial orthostatic response curve from the set of dicrotic notch positions and amplitudes; evaluating the initial orthostatic response curve to obtain an assessment of the initial orthostatic response; and displaying, storing and/or transmitting at least one of the initial orthostatic response curve and a visual representation of the assessment of the initial orthostatic response curve.

20 Claims, 10 Drawing Sheets

(56) References Cited

OTHER PUBLICATIONS

Hebert et al., "Relation Between Aortic Dicrotic Notch Pressure and Mean Aortic Pressure in Adults" The American Journal of Cardiology, volue 76, Aug. 1, 1995, pp. 301-306.
Wieling et al., "Initial orthostatic hypotension: review of a forgotten condition" Clin Sci (Lond). Feb. 2007;112(3):157-65.
Stewart and Clarke, "He's Dizzy when he Stands Up. An Introduction to Initial orthostatic Hypotension" J Pediatr. Mar. 2011;158(3):499-504.
Van Wijnen et al., "Noninvasive beat-to-beat finger arterial pressure monitoring during orthostasis: a comprehensive review of normal and abnormal responses at different ages" Journal of Internal Medicine 282(6), pp. 1-17, May 2017.
Van Twist et al., "Initial orthostatic hypotension among patients with unexplained syncope: an overlooked diagnosis?" Int J Cardiol. Nov. 15, 2018;271:269-273.
Finapres NOVA Brochure, Finapres Medical Systems, accessed Oct. 2021 (2 pages) <https://www.finapres.com/wp-content/uploads/2021/06/46364-WT-Finapres-brochure_NOVA_ONLINE. pdf>.

* cited by examiner

SYSTEM AND METHOD FOR PERFORMING ASSESSMENTS BASED ON ORTHOSTATIC MEASUREMENTS

CROSS-REFERENCE

This application claims the benefit of U.S. Provisional Patent Application No. 63/319,638 filed Mar. 14, 2022; the entire contents of Patent Application 63/319,638 is hereby incorporated by reference.

FIELD

The various embodiments described herein generally relate to one or more systems and methods for performing assessments based on orthostatic measurements.

BACKGROUND

When an individual stands up from a sitting position, there is a sudden fall in blood pressure. The unconscious nervous system, also known as the autonomic nervous system (ANS) responds to the fall in blood pressure in a manner that restores blood pressure to maintain blood flow to the brain. This response is known as the orthostatic response. To restore blood pressure, the ANS can use multiple mechanisms, including increasing heart rate, increasing venous return to the heart and increasing the force of cardiac contractions.

Identification of individuals with poor tolerance to orthostatic challenges can allow interventions and changes in medication to be made, which can lead to an improvement in orthostatic response.

Pulse signals contain information about the status of an individual's health. For example, during an orthostatic challenge, the orthostatic response of an individual can be evaluated using pulse signals, which include information on blood pressure and heart rate.

Currently, there are two primary methods of evaluating an individual's orthostatic response, both involving taking arterial pressure readings. The first method involves applying a brachial arterial pressure inflatable cuff to an individual's arm while the individual is lying down or sitting, performing a first arterial pressure reading, standing the patient up, waiting a short period of time, and performing a second arterial pressure reading. A variation of this first method involves applying a fingertip measurement system that provides continuous arterial pressure measurements to an individual's finger and performing a similar standing test. The second conventional method involves the use of a tilt table to which a patient is secured. The table is then gradually tilted from a horizontal to vertical position to simulate the effect of standing up. During test using these techniques, which may range from 5 to 45 minutes, multiple blood pressure readings and heart rate measurements are taken.

Generally, known methods for determining orthostatic response use sophisticated and costly hardware and/or require a trained expert.

SUMMARY OF VARIOUS EMBODIMENTS

According to one broad aspect of the teachings herein, in at least one embodiment described herein there is a method for evaluating an initial orthostatic response of an individual during an orthostatic test, the method comprising: receiving a pulse signal obtained during the orthostatic test performed from a sensor placed on the individual; identifying a position and an amplitude of a dicrotic notch for pulses in a portion of the pulse signal to obtain a set of dicrotic notch positions and amplitudes; generating an initial orthostatic response curve from the set of dicrotic notch positions and amplitudes; evaluating the initial orthostatic response curve to obtain an assessment of the initial orthostatic response; and displaying, storing and/or transmitting at least one of the initial orthostatic response curve and a visual representation of the assessment of the initial orthostatic response curve.

In at least one embodiment, identifying the position and the amplitude of the dicrotic notch for a given pulse in a portion of the pulse signal comprises: determining a first derivative and a second derivative for the given pulse; identifying a peak of the first derivative occurring at a first time within a search window using the first derivative; identifying a peak of the second derivative occurring at a second time that is later than the first time within the search window; measuring a height of the pulse signal at the second time where the second time is the position of the dicrotic notch; and normalizing the height of the dicrotic notch where the normalized height is the amplitude of the dicrotic notch.

In at least one embodiment, normalizing the height of the dicrotic notch comprises: identifying a minimum of the pulse signal occurring at a third time that is earlier than the first time within the search window; measuring a height of the pulse signal at the third time to obtain a pulse onset value; identifying a maximum signal value of the pulse signal occurring at a fourth time that is later than the third time and earlier than the first time within the search window and measuring the height of the pulse signal at the fourth time; and determining a normalized height of the dicrotic notch based on the pulse onset value and the maximum signal value.

In at least one embodiment, evaluating the initial orthostatic response curve comprises: parsing a first portion of the initial orthostatic response curve to measure an average height of the initial orthostatic response curve; parsing a second portion of the initial orthostatic response curve occurring after the first portion to identify a maximum within the second portion; and determining a first ratio of the maximum to the average.

In at least one embodiment, evaluating the initial orthostatic response curve further comprises: parsing a third portion of the initial orthostatic response curve occurring after the second portion to identify a minimum within the third portion; and determining a second ratio of the minimum to the average.

In at least one embodiment, the search window corresponds to 60% of the given pulse.

In at least one embodiment, the method further comprises assigning a numerical score for the assessment of the initial orthostatic response of the individual based on at least one of the first ratio and the second ratio.

In at least one embodiment, the method further comprises assigning the assessment of the initial orthostatic response of the individual to a category based on the numerical score.

In at least one embodiment, the method further comprises assigning the individual a numerical score indicating the initial orthostatic response based on a first metric indicating an amount of time for the initial orthostatic response curve to return to baseline and a second metric indicating an amplitude of a fall below a percentage of baseline.

In at least one embodiment, the method further comprises displaying the visual representation of the assessment of the initial orthostatic response comprises indicating the numerical score using a dial indicator.

In at least one embodiment, evaluating the initial orthostatic response curve comprises: determining a resting orthostatic response curve; determining a stimulated orthostatic response curve corresponding to the initial orthostatic response of the individual when a stimulus is applied to the individual; determining a difference between the resting orthostatic response curve and the stimulated orthostatic response curve; and determining a score based on the determined difference for the assessment of the initial orthostatic response.

In at least one embodiment, determining the resting orthostatic response curve comprises: parsing a first portion of the initial orthostatic response curve; determining a resting orthostatic value representative of the first portion of the initial orthostatic response curve and extrapolating the first portion of the initial orthostatic response curve.

In at least one embodiment, determining the score comprises: summing a corresponding value of N points on the stimulated orthostatic response curve; and determining a ratio of the sum relative to a resting orthostatic value, determined based on the resting orthostatic response curve.

In at least one embodiment, the pulse signal is obtained by measuring one of: a photoplethysmogram (PPG) signal, a tonometry signal, a piezoelectric sensor signal, a capacitive sensor signal and a pressure pulse signal.

In another aspect, in accordance with the teachings herein, there is provided a computer readable medium having stored thereon a plurality of instructions that are executable on a processor of an electronic device for configuring the electronic device to implement a method for evaluating an initial orthostatic response of an individual, wherein the method is defined according to any one of the embodiments described herein.

In another aspect, in accordance with the teachings herein, there is provided an electronic device for evaluating an initial orthostatic response of an individual during an orthostatic test wherein the electronic device comprises: memory for storing software instructions for evaluating the initial orthostatic response; and a processing unit that is operatively coupled to the memory for accessing the software instructions, the processing unit being configured to, when executing the software instructions: receive a pulse signal obtained during the orthostatic test performed from a sensor placed on the individual; identify a position and an amplitude of a dicrotic notch for pulses in a portion of the pulse signal to obtain a set of dicrotic notch positions and amplitudes; generate an initial orthostatic response curve from the set of dicrotic notch positions and amplitudes; evaluate the initial orthostatic response curve to obtain an assessment of the initial orthostatic response; and display, store and/or transmit at least one of the initial orthostatic response curve and a visual representation of the assessment of the initial orthostatic response curve.

In at least one embodiment, the processing unit is further configured to assign the individual a numerical score indicating the initial orthostatic response based on a first metric indicating an amount of time for the initial orthostatic response curve to return to baseline and a second metric indicating an amplitude of a fall below a percentage of baseline.

In at least one embodiment, the processing unit is further configured to assign the assessment of the initial orthostatic response of the individual to a category based on the numerical score.

In at least one embodiment, evaluating the initial orthostatic response curve comprises: determining a resting orthostatic response curve based on the initial orthostatic response curve; determining a stimulated orthostatic response curve corresponding to the initial orthostatic response of the individual when a stimulus is applied to the individual, based on the initial orthostatic response curve; determining a difference between the resting orthostatic response curve and the stimulated orthostatic response curve; and determining a score based on the determined difference for the assessment of the initial orthostatic response.

In another aspect, in accordance with the teachings herein, there is provided a system for evaluating an initial orthostatic response of an individual during an orthostatic test, the system comprising: a sensor unit that is configured to measure pulse signals from the individual; a data acquisition unit that is coupled to the sensor unit for acquiring the measured pulse signals; and an electronic device that is defined according to any of the embodiments described herein.

It will be appreciated that the foregoing summary sets out representative aspects of embodiments to assist skilled readers in understanding the following detailed description. Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

Figure 1:
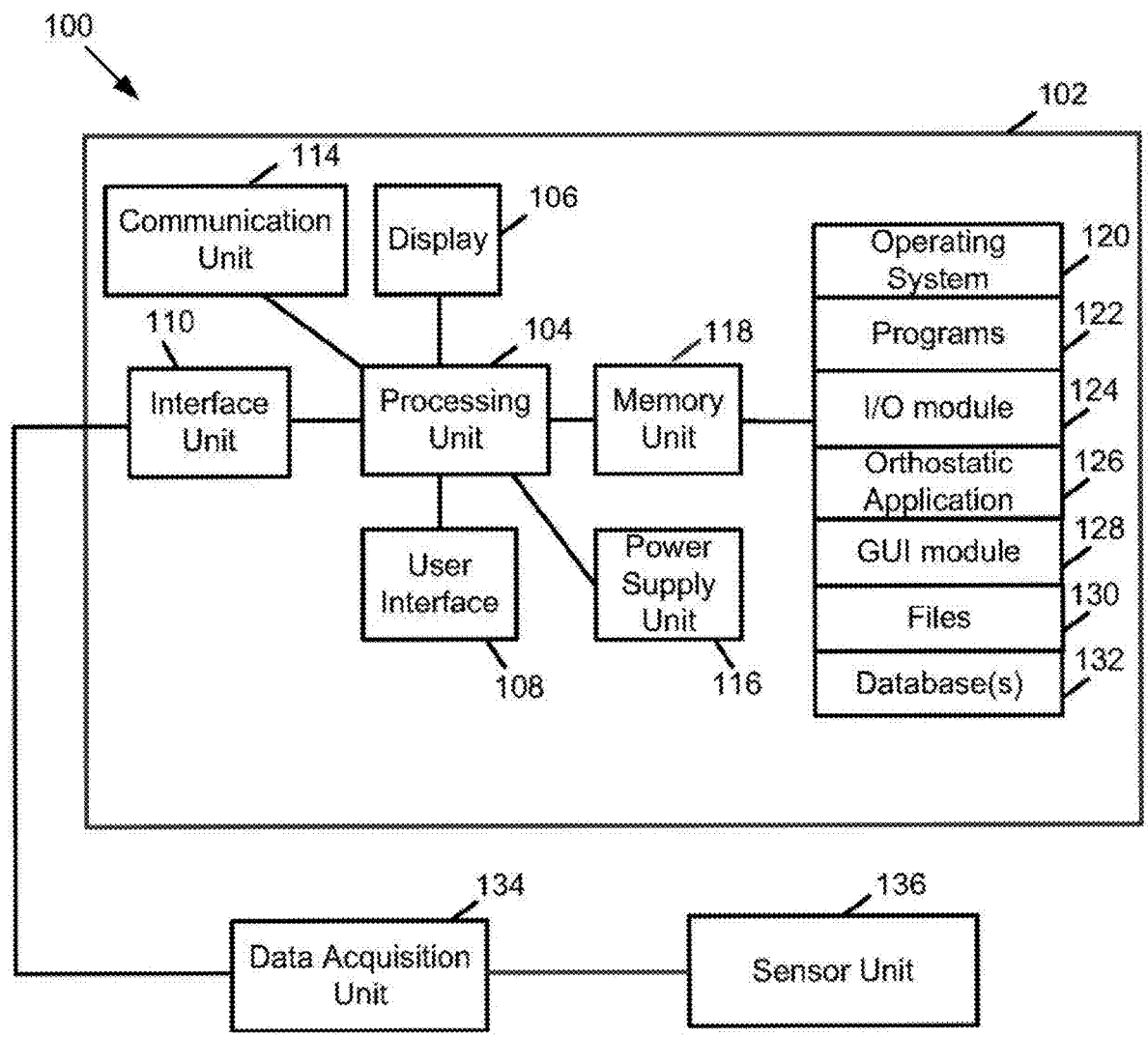
FIG. 1 is a block diagram of an example embodiment of a system for evaluating initial orthostatic response.

Further aspects and features of the example embodiments described herein will appear from the following description taken together with the accompanying drawings.

DETAILED DESCRIPTION OF THE EMBODIMENTS

The headings and Abstract of the Disclosure provided herein are for convenience only and do not interpret the scope or meaning of the embodiments.

Various embodiments in accordance with the teachings herein will be described below to provide examples of at least one embodiment of the claimed subject matter. No embodiment described herein limits any claimed subject matter. The claimed subject matter is not limited to devices, systems or methods having all of the features of any one of the devices, systems or methods described below or to features common to multiple or all of the devices, systems or methods described herein. It is possible that there may be a device, system or method described herein that is not an embodiment of any claimed subject matter. Any subject matter that is described herein that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements or steps. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices can be directly connected to one another or connected to one another through one or more intermediate elements or devices via an electrical element, electrical signal or a mechanical element depending on the particular context.

Unless the context requires otherwise, throughout the specification and claims which follow, the word "comprise" and variations thereof, such as, "comprises" and "comprising" are to be construed in an open, inclusive sense, that is, as "including, but not limited to".

Various terms used throughout the present description may be read and understood as follows, unless the context indicates otherwise: singular articles and pronouns as used throughout include their plural forms, and vice versa; similarly, gendered pronouns include their counterpart pronouns so that pronouns should not be understood as limiting anything described herein to use, implementation, performance, etc. by a single gender. Further definitions for terms may be set out herein; these may apply to prior and subsequent instances of those terms, as will be understood from a reading of the present description.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

Reference throughout this specification to "one embodiment", "an embodiment", "at least one embodiment" or "some embodiments" means that one or more particular features, structures, or characteristics may be combined in any suitable manner in one or more embodiments, unless otherwise specified to be not combinable or to be alternative options.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

Similarly, throughout this specification and the appended claims the term "communicative" as in "communicative pathway," "communicative coupling," and in variants such as "communicatively coupled," is generally used to refer to any engineered arrangement for transferring and/or exchanging information. Examples of communicative pathways include, but are not limited to, electrically conductive pathways (e.g., electrically conductive wires, physiological signal conduction), electromagnetically radiative pathways (e.g., radio waves), or any combination thereof. Examples of communicative couplings include, but are not limited to, electrical couplings, magnetic couplings, radio couplings, or any combination thereof.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

A portion of the example embodiments of the systems, devices, or methods described in accordance with the teachings herein may be implemented as a combination of hardware or software. For example, a portion of the embodiments described herein may be implemented, at least in part, by using one or more computer programs, executing on one or more programmable devices comprising at least one processing element, and at least one data storage element (including volatile and non-volatile memory). These devices may also have at least one input device (e.g., a keyboard, a mouse, a touchscreen, and the like) and at least one output device (e.g., a display screen, a printer, a wireless radio, and the like) depending on the nature of the device.

It should also be noted that there may be some elements that are used to implement at least part of the embodiments described herein that may be implemented via software that is written in a high-level procedural language such as object-oriented programming. The program code may be written in C, C++ or any other suitable programming language and may comprise modules or classes, as is known to those skilled in object-oriented programming. Alternatively, or in addition thereto, some of these elements implemented via software may be written in assembly language, machine language, or firmware as needed.

At least some of the software programs used to implement at least one of the embodiments described herein may be stored on a storage media or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions, such as program code, for one or more processors. The program code may be preinstalled and embedded during manufacture and/or may be later installed as an update for an already deployed computing system. The medium may be provided in various forms, including non-transitory forms such as, but not limited to, one or more diskettes, compact disks, tapes, chips, and magnetic and electronic storage. In alternative embodiments, the medium may be transitory in nature such as, but not limited to, wire-line transmissions, satellite transmissions, internet transmissions (e.g., downloads), media, digital and analog signals, and the like. The computer useable instructions may also be in various formats, including compiled and non-compiled code.

Accordingly, any module, unit, component, server, computer, terminal or device described herein that executes software instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of the device or accessible or connectable thereto.

The orthostatic response can be assessed over shorter or longer periods of time ranging from 30 seconds to 30 minutes. When the orthostatic response is assessed over longer periods of time, a conventional tilt-table method may be used to gradually tilt a subject from a horizontal to a vertical position. When the orthostatic response is assessed over shorter periods of time, up to two minutes, the parameter being measured may be referred to as the initial orthostatic response. The initial orthostatic response may be tested by having a subject stand up rather than being slowly tilted upright using a tilt table. The initial orthostatic response is a well-accepted way of assessing orthostatic function as noted in the article "He's Dizzy when he Stands Up": An Introduction to Initial orthostatic Hypotension, Julian M. Stewart, Debbie Clarke, The Journal of Pediatrics, Oct. 25, 2010.

The orthostatic response can be assessed using a blood pressure cuff placed on an arm and inflated for measurement purposes intermittently. However, using a blood pressure cuff limits measurement of absolute blood pressure changes to a maximal frequency of about once every 30 seconds. Alternatively, the orthostatic response can be assessed using a fingertip continuous non-invasive blood pressure (CNBP) measurement system which allows measurement of absolute blood pressure on a beat-to-beat basis, but these CNBP systems have high cost of greater than $10,000 USD.

However, described herein are various example embodiments that may be used for evaluating the initial orthostatic response of an individual on a beat-to-beat basis (pulse-to-pulse basis) by tracking changes in the height of the dicrotic notch. It has been found by the inventors that changes in the dicrotic notch height are correlated with changes in heart rate and blood pressure, for example, as a result of standing from a sitting position, and that changes in the dicrotic notch height are indicative of relative changes in blood pressure. The dicrotic notch is an inflection on the arterial pulse contour related to the closure of the aortic valve at the end of a cardiac contraction phase (systole), marking the beginning of the cardiac relaxation phase (diastole). The relative height of the dicrotic notch follows changes in both heart rate and blood pressure and accordingly, relative changes in the dicrotic notch indicate relative changes in blood pressure. Accordingly, the methods described herein assess the initial orthostatic response in terms of the pattern of relative blood pressure response, and not in terms of changes in absolute blood pressure changes. The methods described herein also involve a subject standing up from a sitting position to initiate orthostatic stress, which is a simpler approach with no need for sophisticated testing equipment, and can therefore be done in an affordable way.

Orthostatic response is affected by various factors: (a) aging, (b) illnesses such as diabetes, and Parkinson's disease, (c) strokes, (d) fatigue, (e) stress, (f) lack of exercise, (g) medications, (h) hydration, (i) poor diet and other factors. The orthostatic response is mediated through actions of the autonomic nervous system (ANS) and can therefore provide insight into an individual's ANS function, which may be affected by the above-noted factors. Accordingly, at least one of the embodiments described herein may also be used to track changes in an individual's initial orthostatic response over time as part of program for tracking lifestyle changes and the effect of medication and other health initiatives. Observation of the pattern of blood pressure response using the techniques described herein has value in identifying individuals with orthostatic challenges in a cost-effective manner.

Evaluating an individual's orthostatic response can allow medical practitioners to identify individuals with an exaggerated orthostatic response, which can be characterized by a slow and/or incomplete recovery to baseline. For example, a poor tolerance to orthostatic challenges in older individuals is associated with a higher risk of falls. Other health and wellness practitioners may also use the orthostatic response to recommend treatments such as, but not limited to, improving daily fluid intake, improving sleep quality, use of supplements augmenting Autonomic Nervous System function, wearing compression stockings to prevent blood from pooling in the legs, adding a small amount of salt to the diet and changing position slowly. Individuals hoping to maximize health and physical or mental performance and aging individuals hoping to maximize longevity through maintenance of ANS function may also be interested in evaluating orthostatic response.

The Orthostatic Response is managed by the unconscious nervous system also known as the Autonomic Nervous System (ANS). Tracking the pattern of blood pressure (BP) response to standing using the methods discussed in this patent application is a novel way of assessing ANS function. Accordingly, at least one of the embodiments described herein provides a system and/or method for determining the ability of an individual's ANS to return to a baseline following an orthostatic challenge such as, for example, within two minutes after standing from a sitting position. This may be used as an indicator of initial orthostatic response. Tracking the pattern of BP response to standing using one of the methods described herein may be used to identify individuals whose blood pressure does not return well to baseline values with either delayed return to baseline and/or return to a low percentage of baseline values. These individuals may be at risk of light-headedness leading to falls that is an especially important observation in the elderly.

At least one of the embodiments described herein provides a system and/or method for evaluating the initial orthostatic response of an individual using an arterial pulse signal acquired in a simple, non-invasive and cost-effective manner, allowing the initial orthostatic response to be evaluated using a bedside approach. For example, the initial orthostatic response may be determined from a pulse signal acquired from the exterior of the individual's body. Generally, pulse signals include three wave components: a primary wave, a reflected wave and a dicrotic notch. Analysis of a pulse signal can allow for the identification of the dicrotic notch.

The aortic reflected wave is a wave that originates in the aorta and other blood vessels distal to the aorta. Each cardiac contraction initiates a primary wave that travels down the walls of the aorta. Reflections of the primary wave are generated and return towards the heart in response to various reflecting sites. Reflecting sites can include, but are not limited to, sites where the aorta is connected to other blood vessels (e.g., renal arteries), sites where the aorta narrows, sites where the aorta wall properties vary, sites where the aorta bifurcates to form the iliac arteries and various other reflecting sites that may occur, such as in response to a range of phenomena associated with the distal arterial tree, for example. Reflections occurring at a number of separate sites can sum to form a reflected wave that may be detectable in an arterial pulse signal acquired from a suitable location. The aortic reflected wave transit time is associated with aortic pulse wave velocity (PWV). Aortic PWV varies directly with blood pressure since as blood pressure increases, the aortic PWV also increases. The dicrotic notch height varies with changes in aortic PWV. Accordingly, as blood pressure increases, the dicrotic notch height also rises. Conversely, as blood pressure decreases, the dicrotic notch falls. Identifying dicrotic notch height accordingly allows for tracking of relative changes in blood pressure.

An arterial pulse signal can be acquired non-invasively using a variety of techniques. In many cases, pulse sensors placed on, or superior to, an individual's lower abdomen are able to acquire the arterial pulse signal. Examples of suitable locations for non-invasive arterial pulse sensors include placement on the trunk, upper extremities, including fingers, and head of an individual although other suitable locations may also be used. Suitable sensor locations generally refer to sensor locations that allow acquisition of the arterial pulse signal such that a dicrotic notch can be identified in the arterial pulse signal.

It is possible that suitable locations may be identified by analyzing the pulse signals received from the pulse sensors. For example, in some cases, the pulse signal may be analyzed to determine that it has a sufficient signal to noise ratio and contains signal components corresponding to the primary wave, the reflected wave and the dicrotic notch. For example, the received pulse signals may be compared to error condition thresholds. If the pulse signals satisfy the error condition thresholds (i.e., if the pulse signals are not considered erroneous or invalid based on the set thresholds) then the location may be identified as being a suitable location for evaluating the individual's orthostatic response.

In various embodiments described in accordance with the teachings herein, once the arterial pulse signal has been acquired, signal analysis techniques can be applied in order to determine the orthostatic response. In various embodiments described herein, derivatives of the arterial pulse signal may be analyzed in order to determine the orthostatic response.

In some cases, polynomial smoothing methods may be used to smooth a received pulse signal and obtain derivatives of the arterial pulse signal. For example, the Savitzky-Golay method of polynomial curve fitting can be used in at least one embodiment to determine and smooth pulse signal derivatives while retaining high frequency content. Various alternative polynomial smoothing techniques may be used, such as spline interpolation for example.

In some embodiments described herein, the first and second derivatives of the pulse signal may be used to derive the orthostatic response. For example, the first derivative can be used to identify a local maximum of a pulse in the pulse signal. The maximum of the second derivative can be used to locate the dicrotic notch of each heartbeat, which can be used to derive an initial orthostatic response curve, which in turn can be analyzed to evaluate the individual's initial orthostatic response to obtain an assessment of the individual's initial orthostatic response.

Referring now to FIG. 1, shown therein is a block diagram of an example embodiment of a system 100 that can be used to evaluate the orthostatic response of an individual. The system 100 includes an electronic device 102, a data acquisition unit 134, and a sensor unit 136. The system 100 is provided as an example and there can be other embodiments of the system 100 with different components or a different configuration of the components described herein. The system 100 further includes several power supplies (not all shown) connected to various components of the system 100 for providing power thereto as is commonly known to those skilled in the art. In general, a user may interact with the electronic device 102 to acquire pulse signals from a sensor unit 146 located on the exterior of an individual, to perform pulse signal analysis and review the results of the analysis.

The electronic device 102 comprises a processing unit 104, a display 106, a user interface 108, an interface unit 110, a communication unit 114, a power supply unit 116 and a memory unit 118. The memory unit 118 includes random access memory ("RAM") and non-volatile storage for storing data files and software code for various programs such as those used to provide an operating system 120 and other programs 122 as well as software modules that are used perform various functions related to evaluating orthostatic response and/or displaying results such as an I/O module 124, an orthostatic application 126, a Graphical User Interface (GUI) module 128, files 130 and one or more databases 132. Various components of the electronic device 102 may be connected by a communication bus to facilitate communication therebetween and a power bus to receive power from the power supply unit 116. The electronic device 102 can be implemented using a desktop computer, a laptop, a mobile device, a tablet, and the like. In other embodiments, the electronic device 102 may have a different configuration and/or include other components while still providing the orthostatic testing functionality discussed herein.

The processing unit 104 controls the operation of the electronic device 102 and can be any suitable processor, controller or digital signal processor that can provide sufficient processing power processor depending on the configuration, purposes and requirements of the system 100 as is known by those skilled in the art. For example, the processing unit 104 may be a high performance general processor. In alternative embodiments, the processing unit 104 may include more than one processor with each processor being configured to perform different dedicated tasks. In alternative embodiments, specialized hardware can be used to provide some of the functions provided by the processing unit 104.

The display 106 can be any suitable display that provides visual information depending on the configuration of the electronic device 102. For instance, the display 106 can be a flat screen monitor, a touch screen and the like if the electronic device 102 is a desktop computer. In other cases, the display 106 can be a display suitable for a laptop, tablet or handheld device such as an LCD-based display and the like. The display 106 can provide notifications to the user of the electronic device 102.

Figure 7:
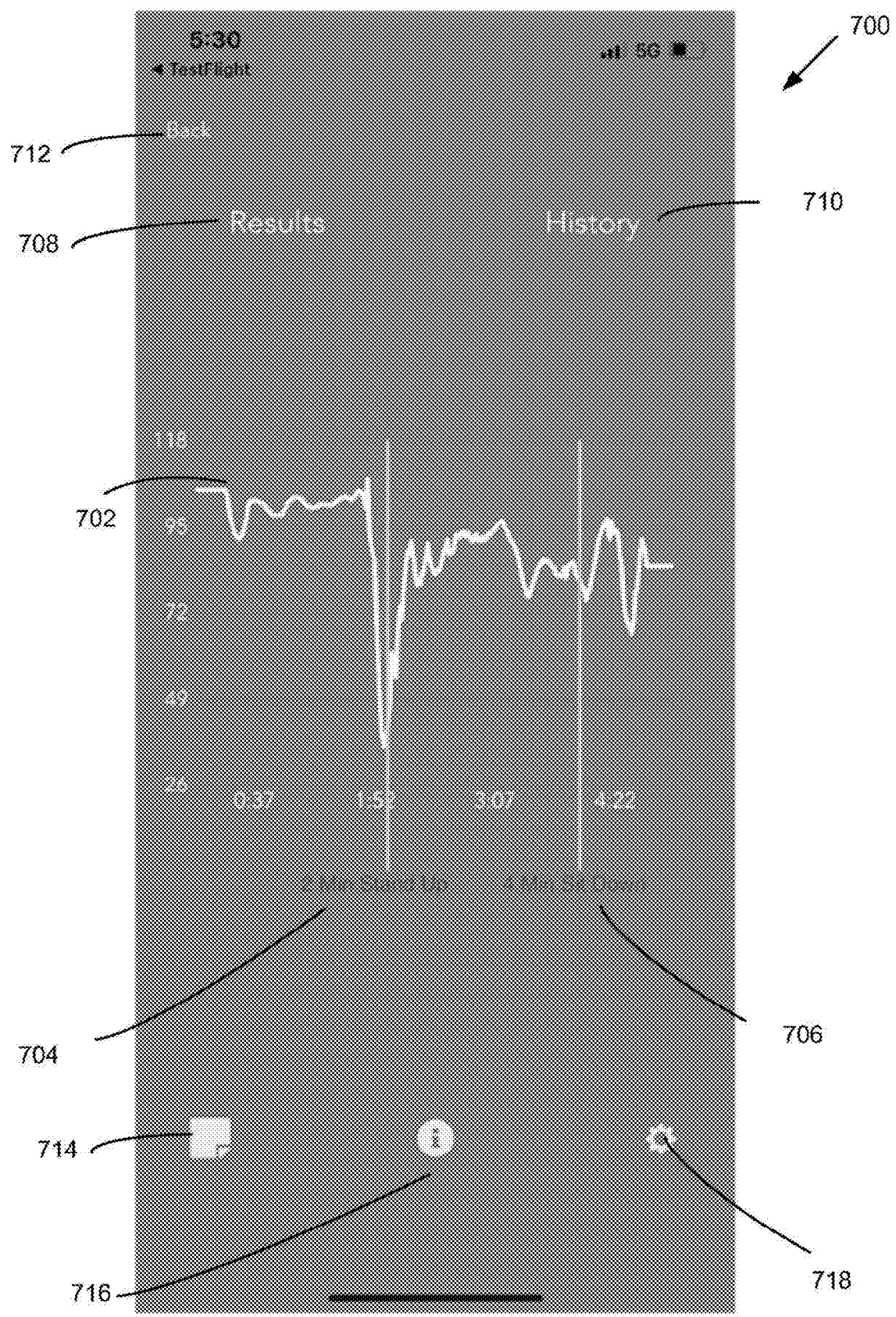
FIG. 7 is a screenshot of an example embodiment of a graphical user interface (GUI) showing a plot of an initial orthostatic response curve that may be presented to a user.
Figure 8:
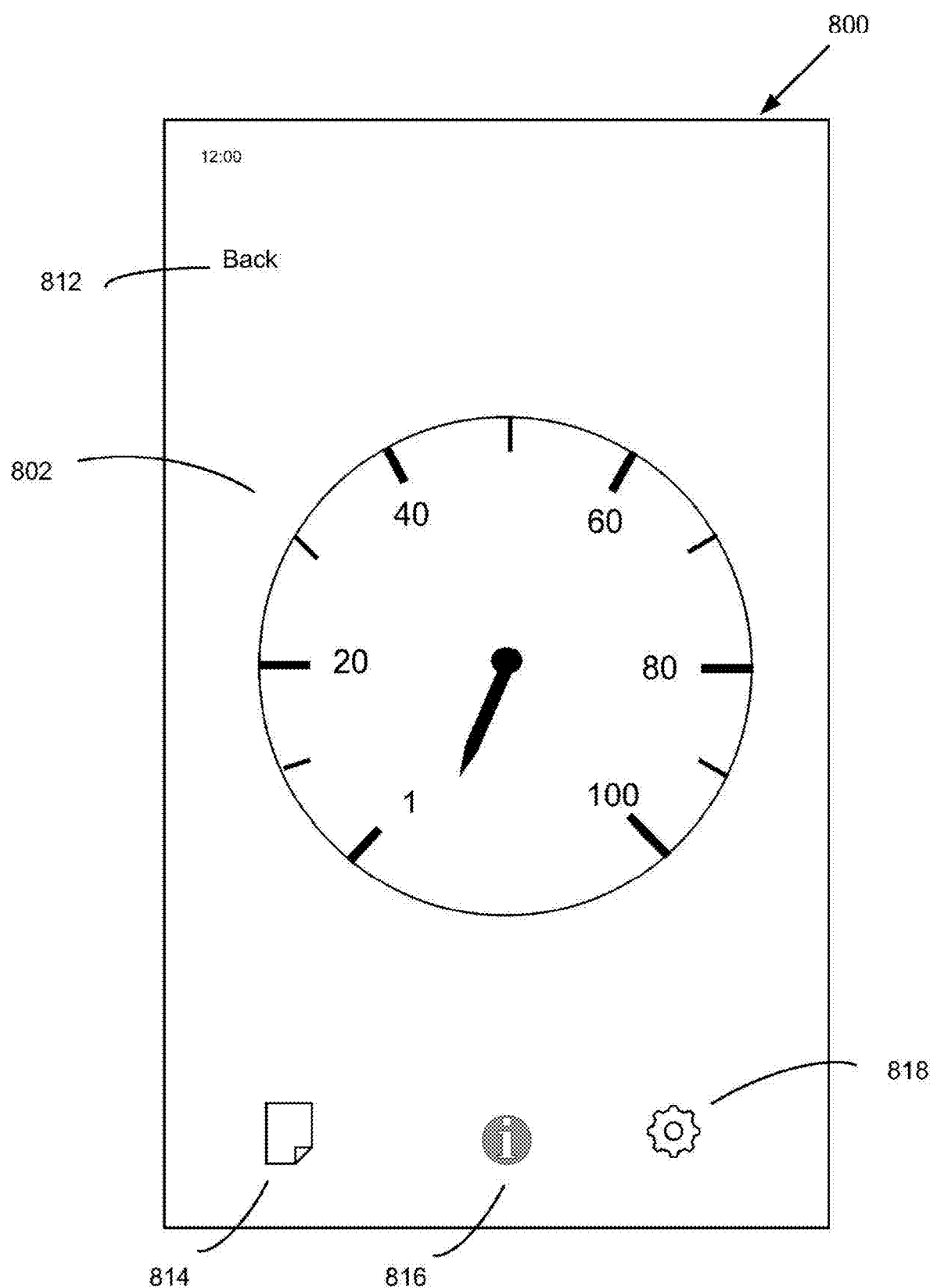
FIG. 8 is a screenshot of an example embodiment of another GUI that may be presented to the user.

The user interface 108 enables a user to provide input via one or more input devices, which may include, but is not limited to, a mouse, a keyboard, a trackpad, a thumbwheel, a trackball, voice recognition, a touchscreen, one or more push buttons, and/or a scroll wheel, for example, depending on the implementation of the electronic device 102. The user interface 108 also outputs information to one or more output devices, which may include, for example, the display 106, a printer and/or a speaker. In some cases, the display 106 may be used to provide one or more GUIs through an Application Programming Interface. A user may then interact with the one or more GUIs via the user interface 108 for configuring the electronic device 102 to operate in a certain fashion and/or providing input data. For example, the user may input data for system parameters that are used for proper operation of hardware and software that is used for performing orthostatic evaluation, such as calibration data and operating parameters. Examples of GUIs that may be shown to a user on the display 106 are shown in FIGS. 7-8.

The interface unit 110 can be any interface that allows the electronic device 102 to communicate with other devices external to the electronic device 102 such as sensors, signal processing hardware, other electronic devices including computers, mobile devices, tablets, servers and the like. In some cases, the interface unit 110 can include at least one of a serial port, a parallel port or a USB port that provides USB connectivity. The interface unit 110 can also include at least one of an Internet, a Local Area Network (LAN), an Ethernet, a Firewire, a modem or a digital subscriber line connection. In some embodiments, various combinations of these elements may be incorporated within the interface unit 110.

The communication unit 114 can be a radio that communicates utilizing CDMA, GSM, GPRS or Bluetooth protocol according to standards such as IEEE 802.11a, 802.11b, 802.11g, or 802.11n. The communication unit 114 can be used by the electronic device 102 to communicate with other devices or computers. The communication unit 114 can be a radio that communicates utilizing CDMA, GSM, GPRS or Bluetooth protocol according to standards such as IEEE 802.11a, 802.11b, 802.11g, or 802.11n. The communication unit 108 can provide the processing unit 104 with a way of communicating wirelessly with various devices that may be remote from the system 100.

The power supply unit 116 can be any suitable power source or power conversion hardware that provides power to the various components of the electronic device 102. The power supply unit 116 may be a power adaptor or a rechargeable battery pack depending on the implementation of the electronic device 102 as is known by those skilled in the art. In some cases, the power supply unit 116 may include a surge protector that is connected to a mains power line and a power converter that is connected to the surge protector (both not shown). The surge protector protects the power supply unit 116 from any voltage or current spikes in the main power line and the power converter converts the power to a lower level that is suitable for use by the various elements of the electronic device 102. In other embodiments, the power supply unit 116 may include other components for providing power or backup power as is known by those skilled in the art.

The memory unit 118 includes and non-volatile storage such as ROM, one or more hard drives, one or more flash drives or some other suitable data storage elements. The non-volatile storage may be used to store software instructions, including computer-executable instructions, for implementing the operating system 120, the programs 122 and other software modules, as well as storing any data used by these software modules. The data may be stored in the database(s) 132 and/or data files 130, such as for data relating to patients that are undergoing orthostatic testing using the system 100. The data files 130 can be used to store data for the electronic device 102 such as device settings, parameter settings, calibration data, measured orthostatic test data, processed orthostatic test data, orthostatic results and/or treatment recommendations, for example. The files 130 can also store other data required for the operation of the orthostatic application 126 or the operating system such as dynamically linked libraries and the like.

The I/O (input/output) module 124 includes software instructions that, when executed by the processor(s) of the processing unit 104, configure the processor(s) to obtain pulse signal data from a patient, store data in the files 130 or database(s) 132 and/or retrieve data from the files 130 or database(s) 132. For example, the I/O module 124 may be used to obtain pulse signals that are sensed by the sensor unit 136 and may be preprocessed by the data acquisition unit 134. The I/O module 124 may also include software instructions to allow the processor(s) to obtain pulse signal data from another computing device via the interface unit 110 or the communication unit 114, for example, rather than obtaining the pulse signal data by using the data acquisition unit 134 and the sensor unit 136. In other words, there may be cases in which the data acquisition interface module 124 may obtain pre-recorded pulse signal data for analysis by the orthostatic application 126. In other words, there may be cases in which pre-recorded pulse signal data may be obtained for analysis by the orthostatic application 126.

In another aspect, the I/O (input/output) module 124 includes software instructions that, when executed by the processor(s) of the processing unit 104, configure the processor(s) to store any input data from the user, such as control inputs, operational parameters and/or patient data (such as, but not limited to, identity, age, and physiological condition) that is received through one of the GUIs. In addition, any measured data and/or computed data, such as initial orthostatic response curves, initial orthostatic response scores and/or medical treatments, may be provided through use of the input/output module 124 in a user interface from the GUI module 128 for viewing by the user on the display 106. Alternatively, or in addition thereto, such measured data, computed data and/or medical treatment data may be provided through use of the input/output module 124 to the communication unit 114 or interface unit 110 for transmission to another electronic device and/or a remote storage device.

Depending on the whether the user is a patient or a medical professional that is performing orthostatic tests on patients, the orthostatic application 126 include various software instructions that allow the user to interact with the electronic device 102 to perform various functions such as, but not limited to, obtaining pulse signal data obtained during an orthostatic test, processing the pulse signal data to obtain orthostatic data, displaying the acquired pulse signal data and/or orthostatic test data, receiving input for adjusting parameters for data acquisition and/or analysis, displaying medical treatment recommendations and/or sending electronic messages with test results and/or medical treatment recommendations to another electronic device. The orthostatic application 126 may also process the pulse signal data to determine whether the acquired signals satisfy error condition thresholds. Such error processing may be used to determine whether the sensor unit 136 has been placed at a suitable location for identifying the individual's aortic pulse wave velocity.

The GUI module 128 includes software instructions that, when executed by the processor(s) of the processing unit 104, configure the processor(s) to generate various GUIs that are then output on the display 106, or another visual output device, to allow the user to perform various functions such as displaying raw and/or processed data from the orthostatic application 124. The GUI module 128 also includes software instructions for displaying treatment recommendations based on the orthostatic test results.

The data acquisition unit 134 is implemented in hardware including circuitry that may be used to preprocess pulse signal data that is measured by the sensor unit and send the preprocessed signal data to the electronic device 102 where it may be further processed and/or stored. Accordingly, the data acquisition unit 134 includes preprocessing hardware such as one or more analog filter(s) and one or more amplifier(s) along with analog to digital conversion circuitry. Alternatively, the data acquisition unit 134 may include a processor with memory that executes firmware software instructed stored in the memory to provide digital filtering and amplification after the pulse signal data has been digitized.

In at least one alternative embodiment, the data acquisition unit 134 and the sensor unit 136 may be combined as a single unit. Alternatively, in at least one embodiment, the data acquisition unit 134, the sensor unit 136 and the electronic device 102 may be combined as a single unit. In some cases, the data acquisition unit 134 and the sensor unit 136 may be wireless devices that are wirelessly coupled to the electronic device 102 and they may each (or in a combined unit) include a battery or other power source.

The data acquisition unit 134 may send data that has been measured from the individual being tested to the electronic device 102 where the measured data may include various physiological data such as, but not limited to, at least one of pulse signal data, and heart rate data, oxygen saturation data as well as hardware operational data such as battery voltage data, for example. In some cases, the data may be encoded so as to ensure that missed data can be detected. For example, where a 20 bit pulse sample is used, the data acquisition unit 130 may assign a number from 0 to 255 to each 20 bit pulse sample. The data acquisition interface 34 can extract 20 bit pulse samples and ensure that the 0 to 255 assigned numbers are incrementing in a way that indicates no missed data. In some cases, if there is missed data then the missed data can be replaced with an average of the samples immediately before and after the missed data. The samples may then be combined into a continuous data sample for analysis.

In at least one embodiment, the sensor unit 136 may be an optical pulse sensor. Non-invasive optical pulse sensors can detect variations in light transmitted through or reflected from skin surfaces. In some embodiments, an optical sensor can be placed over an individual's finger to acquire a pulse signal. Other suitable sensor locations for an optical sensor may include, but are not limited to, the hypothenar area of the palm, the external auditory canal and any other area of the skin surface that allows for acquisition of the arterial pulse signal in a high quality manner, including, but not limited to the scalp, ear, neck, chest and extremities. A wide variety of other suitable locations may be used to acquire signals using an optical pulse sensor.

Various modifications can be made to the sensor unit 136. For example, light in the red, green or other wavelength regions may be effectively employed. In some embodiments, an optical pulse sensor can be operated in a transmission mode for illuminating elements at one side of the fingertip and in a reception mode when a photodetector element is at the other side of the fingertip. Alternatively, in some embodiments, an optical pulse sensor may have an LED and a photodetector element that may be used in a reflective mode arrangement. In some cases, the photodetector element may be a phototransistor or a photodiode.

In some cases, a variety of alternative sensor instruments such as, but not limited to, a pressure tonometer, a piezo film, an impedance plethysmograph, an inflatable cuff, a Doppler ultrasound device, a capacitive sensing device, or a magnetic resonance imaging device, for example, can be used as the sensor unit 136. Accordingly, the example methods for evaluating orthostatic response described herein may be modified to account for differences in the pulse signals acquired by different sensor unit implementations. For example, different processing techniques may be used to account for the differences in the pulse signals.

Suitable sensor locations may also vary for differing sensor instruments. For example, a pressure sensor may use a physically pulsatile arterial pulse signal for adequate operation. Furthermore, in some cases the sensor location may affect the morphology of the acquired pulse signal. Accordingly, at least a portion of the methods described herein may need to be modified in certain cases to account for these changes in morphology.

In some cases, in order to obtain sufficient signal detail for pulse signal analysis, the data acquisition unit 134 and the sensor unit 136 are configured such that the pulse signal is sampled with sufficient sampling speed and resolution. For example, a 200 Hz sampling speed with 20 bits of resolution may be used in some embodiments. In some cases, the sampling speed and sampling resolution of an Analog to Digital convertor (ADC) may be adjusted to improve the relevant physiological data that is obtained during signal acquisition.

As mentioned earlier, in some cases, the sensor unit 136 and the data acquisition unit 134 can be combined in a single unit. For example, in one embodiment, an optical pulse sensor such as an oximeter incorporating an infrared LED, with a wavelength of 880 nm and a matching photodiode, may operate in transmission mode when placed over a finger of the individual. The oximeter may have onboard processing circuitry (i.e., the data acquisition unit 134) that acquires the pulse signal using an analog-to-digital conversion (ADC) at the desired sampling speed and resolution.

As described earlier, the electronic device 102 comprises at least one interface that the processing unit 104 communicates with in order to receive or send information. This interface may be the user interface 108, the interface unit 110 or the communication unit 114, depending on the particular configuration of the electronic device 102. For example, the processing unit 104 may communicate with either one of the user interface 108, the interface unit 110 or the communication unit 114 as well as the display 106 or the I/O hardware 112 in order to output information related to the individual's orthostatic response, including a visual representation of the orthostatic response and a numerical score associated with the orthostatic response and other information that may be derived from the pulse signals or system parameters. As another example, users of the electronic device 102 may communicate information across a network connection to a remote system for storage and/or further analysis in some embodiments. This communication may also include email communication or other communication over a network such as the Internet or a wireless cellular network, for example.

For ease of understanding, certain aspects of the methods described herein are described as being performed by the processor(s) when executing software instructions for the orthostatic application 126. It should be noted, however that these methods are not limited in that respect, and the various aspects of the methods described herein may be performed by other hardware and software components for evaluating orthostatic response.

Figures 2, 3:
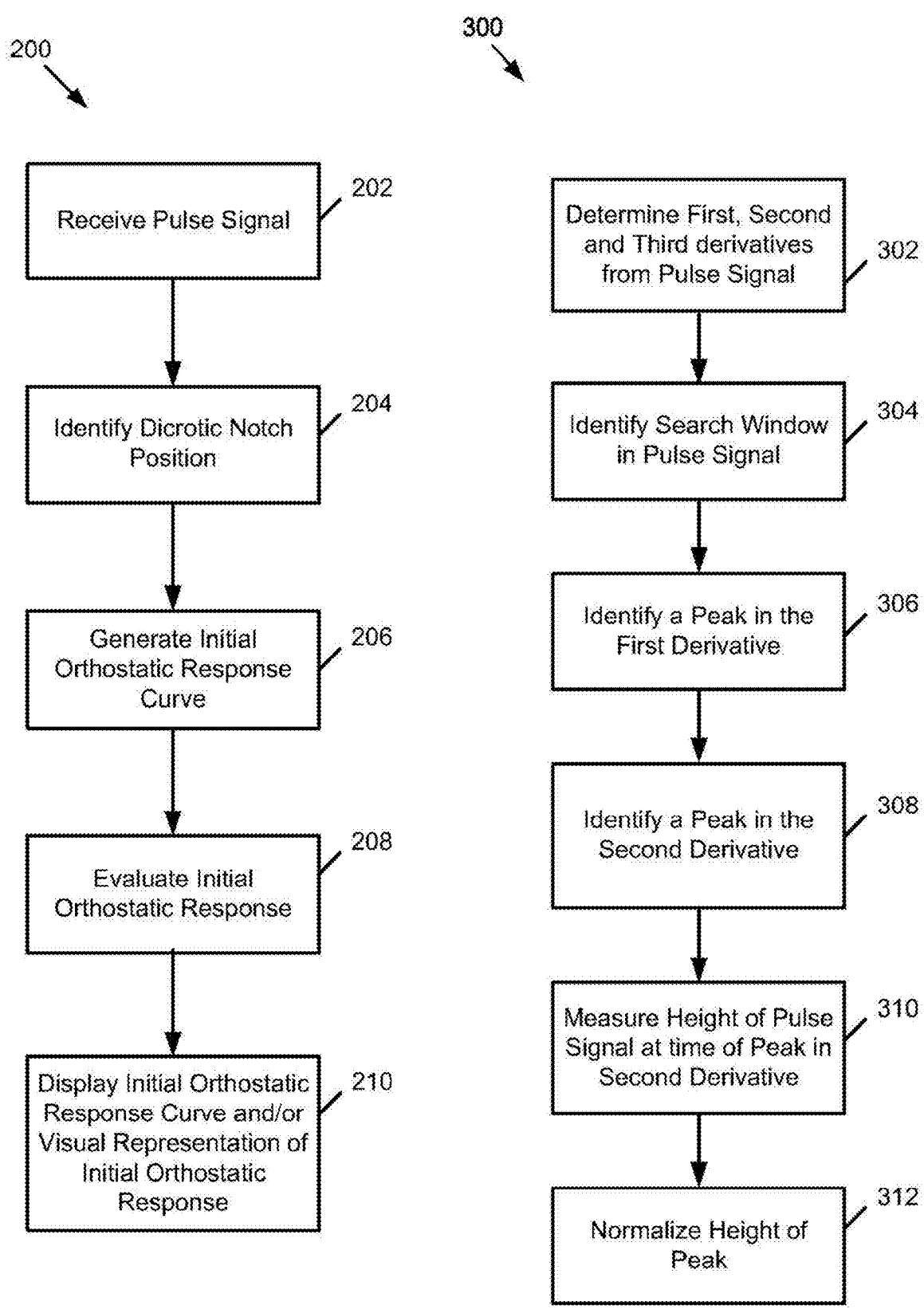
FIG. 2 is a flow chart of an example embodiment of a method for evaluating an initial orthostatic response.
FIG. 3 is a flow chart of an example embodiment of a method for determining a normalized height of a dicrotic notch for generating an orthostatic response curve.

Referring now to FIG. 2, shown therein is a flowchart of an example embodiment of a method 200 for evaluating the initial orthostatic response of an individual using pulse signal data that was obtained during an orthostatic test. Method 200 can be performed by processor(s) of the processing unit 104 when executing software instructions of the various modules described earlier.

During an orthostatic test, an individual may sit for a pre-test sitting time period, stand up from the sitting position for a standing test time period and then return to the sitting position for a post-test sitting time period. Each of the pre-test sitting, standing test and post-test sitting time periods may be predetermined and provided as inputs to the orthostatic application 126 from a user via the user interface 108 or obtained from one of the files 130. Preferably, the duration of the pre-test sitting period is of a sufficient length to allow the individual's blood pressure to settle to a stable baseline value and the duration of the standing test and post-test sitting time periods are of a sufficient length to reveal the initial orthostatic response and post-test changes, respectively. For example, the individual may sit for a pre-test sitting time period of about 2 minutes or more in order to stabilize the individual's blood pressure, then stand from the sitting position and remain in a standing position for a standing testing time period of about 2 minutes or more, and then return to a post-test sitting position for a post-test sitting time period of about 1 minute or more to conclude the test.

At step 202, the method 200 involves obtaining pulse signal data obtained throughout the previously noted three time periods of the orthostatic test. The pulse signal may be received from a sensor unit 42 positioned on the exterior of an individual's body and preprocessed for digitization as described earlier. For example, the sensor unit 42 may be positioned on the individual's finger. Alternatively, the pulse signal data may be obtained from a file from the memory unit 118 or another data store.

The orthostatic application 126 may include software instructions that, when executed by the processor(s) of the processing unit 104, configure the processor(s) to determine if the pulse signal data satisfies at least one error threshold condition prior to evaluating the orthostatic response from the pulse signal data. In some cases, determining if the pulse signal data satisfies the error threshold condition may also be used to determine if the sensor unit 42 has been placed in a suitable sensor location for acquiring the pulse signal according to method 200.

Depending on the type of sensor unit 42 used, the pulse signal may be acquired in different forms. For example, in some embodiments the pulse signal can be acquired as a volume pulse signal, a photoplethysmography (PPG) signal, or a pressure pulse signal, and the orthostatic application 126 may analyze the volume pulse signal, the PPG signal or the pressure pulse signal directly. In alternative embodiments, a tonometry signal, a piezoelectric sensor signal, a capacitive sensor signal or a pressure pulse signal may instead be used.

At step 204, the method 200 involves identifying dicrotic notches in the pulse signal data for a plurality of pulses such as for a majority of the pulses in the pulse signal data obtained during the orthostatic testing where these pulses result in dicrotic height values that are within an acceptable range. For example, pulses may be omitted if the dicrotic notch height values determined from these pulses are irregular such as, for example, dicrotic notch height values that deviate by more than a predetermined number of standard deviations from the mean of the dicrotic notch values. In such examples, the method 200 may involve calculating a mean and a standard deviation of the dicrotic notches to identify pulses for which the height of the dicrotic notches may be used for further processing in determining the orthostatic challenge curve. Accordingly, step 204 will produce a set of dicrotic notches for the orthostatic testing period.

In some cases, the method 200 may involve identifying the dicrotic notch using derivatives of the pulse signal data. Various methods may be used to determine pulse signal derivatives. In at least one embodiment, the pulse signal derivatives may be obtained along with smoothing techniques to generate smoothed derivative signals. For example, the smoothing technique may be, but is not limited to, the Savitsky-Golay technique. The Savitsky-Golay coefficients may be specifically optimized for arterial pulse analysis to define dicrotic related values. This may be done by optimizing the coefficients when processing test data to estimate predetermined dicrotic related values more accurately by using an error reduction technique such as least mean squares.

For example, in at least one embodiment, the first and second derivatives of the pulse signal may be used to identify the dicrotic notch as will be described in further detail below with reference to method 300 shown in FIG. 3. A smoothing window may be applied to the pulse signal to smooth the determined derivatives by, for each data point in the acquired pulse signal data, using adjacent data points within the smoothing window. For instance, when smoothing a given data point, the smoothing window may take into account a set of preceding data points and a set of subsequent data points for the given data point such as, but not limited to, e.g., 4 points before and after, or 6 points before and after etc. In at least one embodiment, the entire data set acquired at step 202 may be processed using this technique to obtain smoothed derivatives. In some cases, the smoothing may be done for each data point in the pulse signal data that is being analyzed. For example, in at least one embodiment, the smoothing window may be a moving window that will move across the entire recording to smooth the curve connecting every point in the recording. In this way every point is adjusted to offer a smoothed curve of the entire recording.

Figure 6:
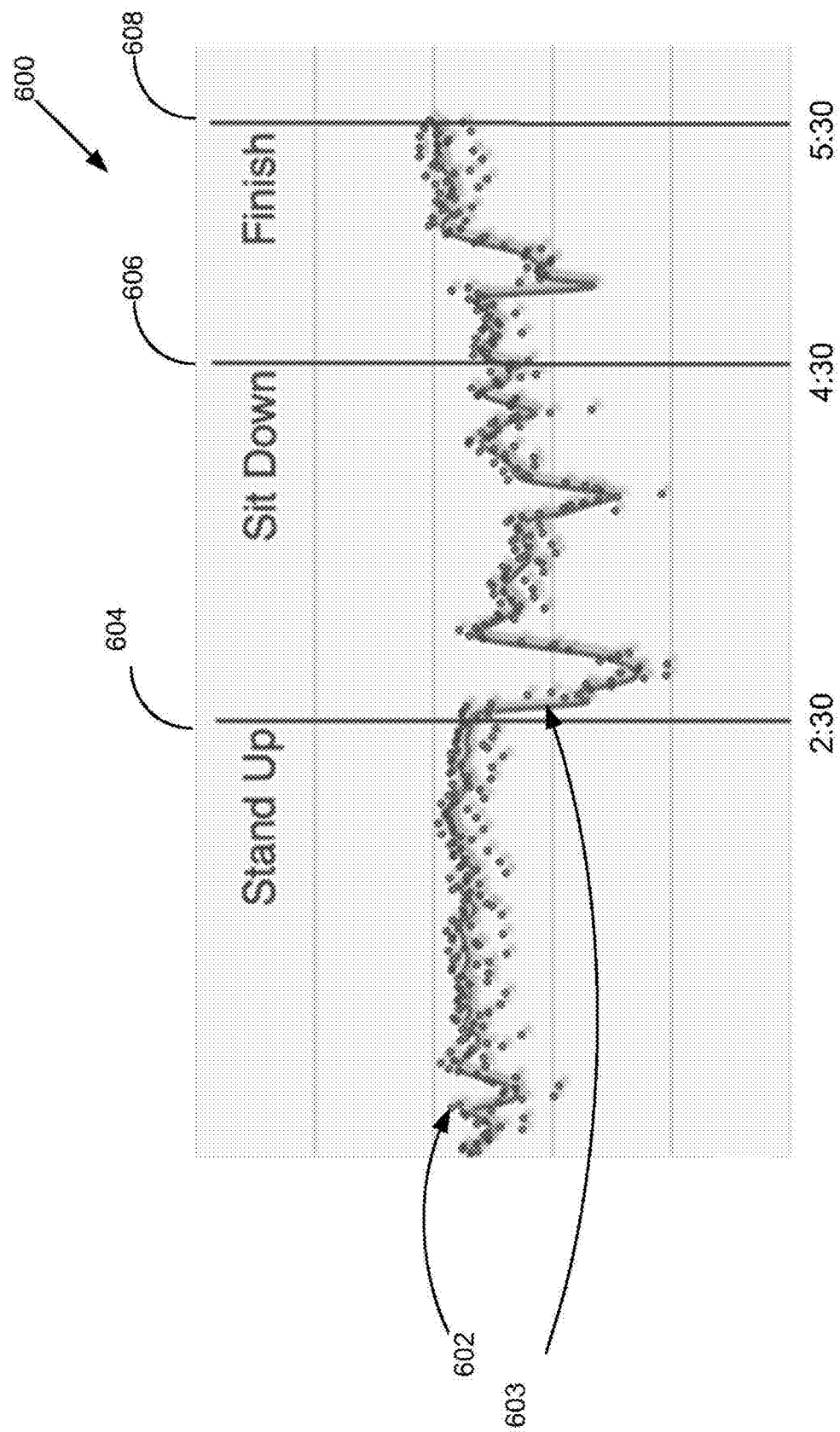
FIG. 6 illustrates a plot of an example initial orthostatic response curve.

At step 204, the method 200 generates an initial orthostatic response curve based on the set of identified dicrotic notches. For instance, the initial orthostatic response curve may be a plot of the dicrotic notch values, an example of which is shown in FIG. 6, which will be described in further detail below. Alternatively, or additionally, the initial orthostatic response curve may correspond to a curve of best fit of the values associated with the identified dicrotic notches, obtained using curve fitting techniques commonly known by those skilled in the art. Additionally, the curve may be smoothed using a polynomial smoothing process or any other suitable method for smoothing a curve, such as, but not limited to, a Savitsky-Golay technique. For example, the curve may be smoothed using a curve fitting/smoothing process to minimize the effect of breathing-related variations affecting the height of the dicrotic notches.

Figure 4:
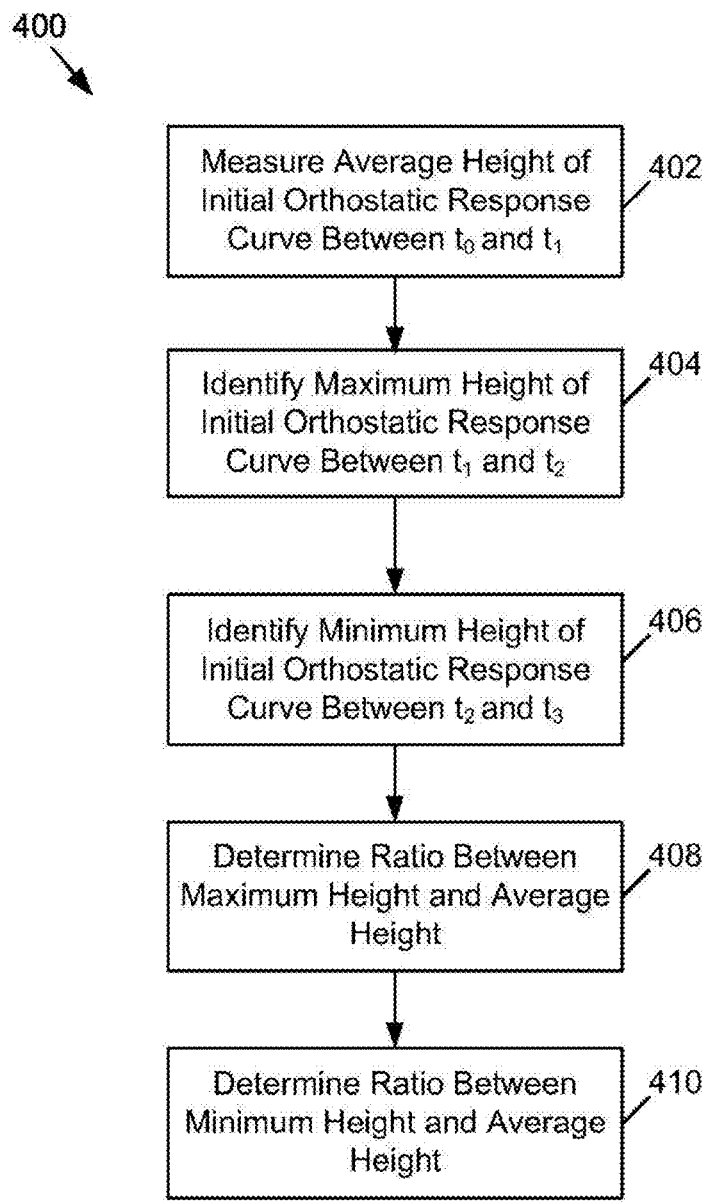
FIG. 4 is a flow chart of part of another example embodiment of a method for evaluating an initial orthostatic response.

At step 208, the method 200 analyzes the initial orthostatic response curve to evaluate the orthostatic response. For example, changes in amplitude in the initial orthostatic response curve when the individual stands up from a sitting position can be evaluated. FIG. 4, which will be described in further detail below, shows a flowchart for an example method for evaluating the initial orthostatic response of an individual.

At 210, the method 200 may display various data regarding the orthostatic test. In some cases, the initial orthostatic response can be displayed on the display 106. For example, the display 106 may display the initial orthostatic response in a GUI such as that shown in FIG. 7, discussed below. Alternatively, or in addition thereto, a score can be assigned to the initial orthostatic response during step 208 and this score can be displayed in a GUI in step 210 such as that shown in FIG. 8, discussed below.

During step 210, the method 200 may also involve transmitting the initial orthostatic response to a remote location for storage or further analysis. For example, the orthostatic test results including the initial orthostatic response data may be transmitted over a network to be stored in a profile for the individual in a database such as a central repository. The user and or individual being tested may be able to access their profile over the network to review the changes in the initial orthostatic response data over time. For example, the orthostatic testing can be done periodically, such as annually, semi-annually, quarterly, monthly or weekly to monitor the individual being tested. This may also allow the individual to share information about their initial orthostatic response observed over time with other individuals such as a health or fitness professional.

During step 210, the method 200 may also involve generating a report of the orthostatic test results. This may include images of the initial orthostatic response curve, numerical scores for the orthostatic test, a historical trend of the individual's initial orthostatic response scores presented for example, as a graph, and/or, background information relating to the orthostatic response to assist individuals in understanding their results.

In some cases, the method 200 may store the initial orthostatic response, the initial orthostatic response test scores and/or treatment recommendations in the database(s) 132. The initial orthostatic response may be stored for further analysis at a later time, for later transmission, for display to the user at a later time or for various other uses. For example, the user may desire reviewing a history of previous initial orthostatic response curves and initial orthostatic response scores and the method 200 may store the orthostatic test data (which includes the initial orthostatic response test scores, raw data and/or treatment recommendations) for such review.

Referring now to FIG. 3, shown therein is a flowchart of an example embodiment a method 300 for identifying a dicrotic notch which may be used to generate the initial orthostatic response data. The method 300 may be used to implement to step 206 of method 200. Method 300 can be performed by processor(s) of the processing unit 104 when executing software instructions of the various modules including the orthostatic application 126 described earlier. The method 300 can be iteratively performed to determine the set of dicrotic notches that occurred during the orthostatic test.

At step 302, the method 300 determines a first derivative, a second derivate, and a third derivative of the pulse signal data that is being analyzed. Various signal analysis techniques may be used to determine these derivatives. For example, the pulse signal may be processed using the Savitzky-Golay polynomial smoothing/differentiation filter method to determine and generate smoothed versions of the first, the second and the third pulse signal derivatives of the pulse signal. The method 300 then involves using the first, second and third derivatives to identify the dicrotic notch.

At step 304, the method 300 involves identifying a search window in the pulse signal data. For example, a pulse in the pulse signal may be detected and then associated with a corresponding search window, which generally includes the pulse and a portion of the pulse signal data surrounding the pulse. For example, the search window may correspond to 60% of a beat length in time. Pulses may be detected by determining a pulse onset point for each pulse. For example, the pulse onset point for each pulse may be determined identifying a local maximum in the first derivative. A pulse onset test window may be used to validate the first local maximum in the first derivative. The pulse onset test window may be determined based on the heart rate, e.g., as a portion of a heartbeat, such as half a beat length in time. Then, analyzing the first derivative backwards in time from the first local maximum in the first derivative, the first local minimum of the pulse signal can be identified. The first local minimum may be determined to be the pulse onset point for a particular heartbeat wave pulse.

At step 306, the method 300 involves identifying a maximum of the first derivative of the pulse signal within the search window. To identify this maximum, the second derivative of the pulse signal may be used. This local maximum of the first derivative of the pulse signal can be identified by zero crossings (from positive to negative) in the second derivative.

At step 308, a maximum of the second derivative of the pulse signal occurring within the search window is identified. Analyzing the second derivative forward in time from the time at which the maximum of the first derivative of the pulse signal located at step 306 occurs, the maximum of the second derivative can be obtained. In at least one embodiment, this maximum can be obtained by analyzing the third derivative of the pulse signal. For example, the maximum of the second derivative can be identified by determining zero crossings (from positive to negative) of the third derivative.

At step 310, the method 300 involves determining the height of the pulse signal at the time at which the maximum of the second derivative occurs, as identified at step 308. This point corresponds to the dicrotic notch of the pulse in the search window.

At step 312, the method 300 involves normalizing the height of the dicrotic notch. As the amplitude of the pulse signal can vary from beat to beat, for example, depending on the individual's heart rate or blood pressure, normalizing the height of the dicrotic notch can allow tracking of the change in amplitude of the dicrotic notch and therefore of the orthostatic response regardless of changes in heart rate or blood pressure.

To normalize the height of the dicrotic notch, the method 300 may determine a pulse onset value for the heartbeat pulse in the pulse signal for which the dicrotic notch is currently being determined. Starting from the local maximum of the first derivative of the pulse signal, as identified at step 306, and moving backward in time within the search window, a lowest signal value can be identified by analyzing the pulse signal. Alternatively, the method described at step 304 may be used to identify the pulse onset and the associated pulse onset value.

The method 300 may then identify a maximum pulse signal occurring between the time at which the pulse signal onset occurs and the time at which the dicrotic notch occurs. Starting from the time at which the pulse onset occurs and moving forward in time, a maximum signal value can be identified by analyzing the pulse signal. Alternatively, starting from the time at which the dicrotic notch occurs and moving backward in time, the maximum signal value can be identified.

The method 300 may then involve normalizing the dicrotic notch based on the amplitudes of the pulse signal that occurred at the pulse onset, the dicrotic notch and at the pulse peak. For example, the normalized dicrotic height can be obtained using the following equation:

$$\text{Dicrotic height}_{normalized} = \frac{\text{Dicrotic height} - \text{Onset}}{\text{Maximum} - \text{Onset}} \quad (1)$$

Steps 302 to 312 may be repeated for each pulse in the portion of the pulse signal data that was obtained during the orthostatic test to provide a set of dicrotic values that occurred during the orthostatic test.

Referring now to FIG. 4, shown therein is a flowchart of an example embodiment a method 400 for analyzing and evaluating an orthostatic response curve, which may be used to determine the initial orthostatic response test results. Initial orthostatic response test results may be used by individuals to help diagnose new medical conditions and monitor existing medical conditions and may optionally be used by medical professionals to recommend medical treatments. For example, initial orthostatic response test results may be used to identify orthostatic hypotension, which may be treated with medication such as antihypertensives, antipsychotic or Parkinsonian medication. Method 400 can be performed by processor(s) of the processing unit 104 when executing software instructions of the various modules including the orthostatic application 126 described earlier. The method 400 can be performed to implement step 208 of method 200.

At step 402, the method 400 involves parsing a first portion of the initial orthostatic response curve for determining the average height of the orthostatic response curve over a first time window by analyzing the first portion of the orthostatic response curve. For example, the average height of the orthostatic response while the individual is in a sitting position prior to standing for the testing period can be determined. As described above, this pre-test sitting period is preferably sufficiently long to allow the individual's blood pressure to settle to a stable baseline value, for example, 2 minutes or more. This average height of the initial orthostatic response curve can be used as a baseline.

At step 404, the method 400 generally involves parsing a second portion of the initial orthostatic response curve occurring after the first portion for identifying a maximum height of the initial orthostatic response curve occurring within a second time window by analyzing the second portion of the orthostatic response curve. The second portion of the initial orthostatic response curve may occur immediately after the first portion of the initial orthostatic response curve that was analyzed at 402 and can correspond to a window of time occurring immediately after the individual has stood up from the sitting position. For example, the second time window may be in the range of about 30 seconds to about 10 minutes in length. The maximum height that is identified can correspond to an approximation of the individual's initial orthostatic response immediately following an orthostatic challenge.

At step 406 the method 400 generally involves parsing a third portion of the initial orthostatic response curve occurring after the second portion for identifying a minimum height of the initial orthostatic response curve that occurs within a third time window by analyzing the third portion of the initial orthostatic response curve. The third portion of the initial orthostatic response curve may occur immediately the second portion that was analyzed in step 404. The third portion can, for example, be 80 seconds in length. The minimum height that is identified may be used to determine the stability of the individual's initial orthostatic response following an orthostatic challenge.

For example, in at least one embodiment, the first portion may coincide with a sitting period for 2 min, the second portion may coincide with a subsequent standing period for 2 min, and the third portion may coincide with a subsequent sitting period for 1 min.

At step 408, the method 400 may involve determining the ratio between the maximum height of the initial orthostatic response curve identified at step 404 and the average height of the initial orthostatic response curve identified at step 402. This ratio characterizes the individual's fall in blood pressure relative to the baseline blood pressure and can be a measure of the extent to which the individual's ANS can recover from an orthostatic challenge within a predetermined time period. A ratio tending towards 1 indicates a relatively small difference between the average height of the initial orthostatic response curve identified at step 402 and the baseline while a ratio tending toward 0 indicates a relatively large difference between the average height of the orthostatic response curve identified at step 402 and the baseline.

At step 410, the method 400 may involve determining the ratio between the minimum height of the initial orthostatic response curve identified at step 406 and the average height of the initial orthostatic response curve identified at step 402. This ratio may be used to identify a fall in blood pressure that may occur within a predetermined period of time after the individual has stood up from a sitting position. A ratio tending toward 0 may be indicative of a fall in blood pressure occurring within the predetermined period while a ratio tending toward 1 may indicate a stable blood pressure following an orthostatic challenge. Based on at least one of the ratios calculated at 408 and 410, an assessment of the initial orthostatic response can be obtained.

Figure 5A:
FIG. 5A is a diagram illustrating an example pulse signal and derivatives of the pulse signal.

Referring now to FIG. 5A, shown therein is a diagram 500 illustrating an example plot of a pulse signal 505, as well as the first derivative 510, the second derivative 520 and the third derivative 525 of the pulse signal 505. In the pulse signal 505, the maximum 540 and minimum 535 can be identified using methods 200 to 400. The maximum 540 and minimum 535, which corresponds to the pulse onset signal, can be determined as described above with reference to FIG. 3. In the first derivative 510, a peak 537, may be determined as described at step 306. In the second derivative 520, a peak, which may be determined as described at step 308, can be identified. In the second derivative 520, a peak, which may be determined as described at step 310, can be identified. The plot 500 shows time represented in seconds on the x-axis and signal amplitude on the y-axis. The signal amplitude for the pulse signal 505 may be derived from a voltage reading of the sensor unit 42 in Volts, while the signal amplitude for the first derivative 510, the second derivative 520 and the third derivative 525 are derivatives of the signal amplitude of the volume pulse signal 505 that may be determined using various signal processing techniques apparent to those skilled in the art such as, but not limited to, for example, the Savitzky-Golay method of polynomial smoothing.

Figure 5B:
FIG. 5B is a diagram illustrating another example pulse signal and derivatives of the pulse signal.
Figure 5C:
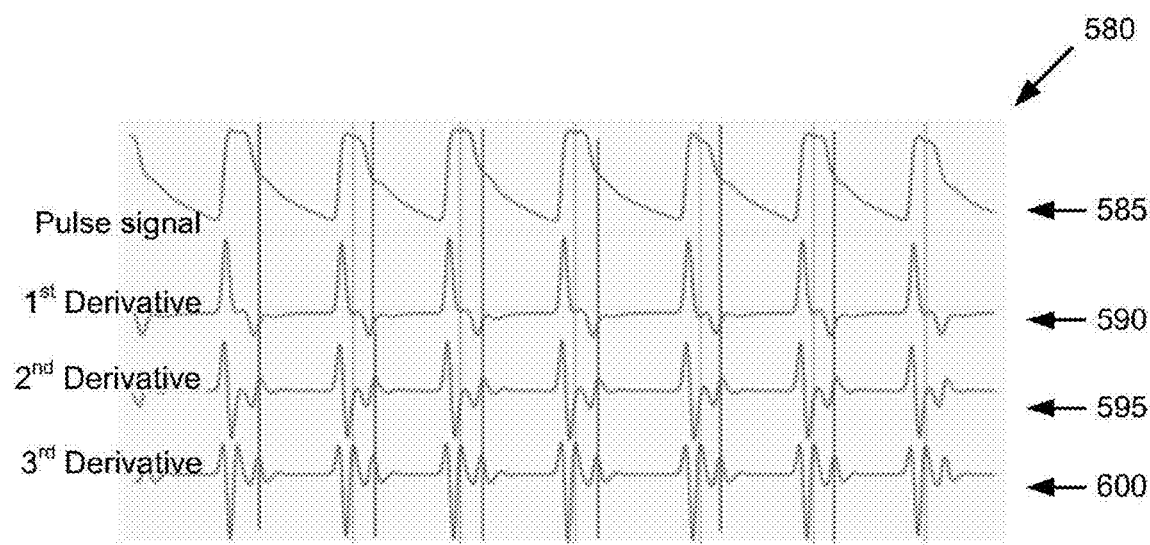
FIG. 5C is a diagram illustrating another example pulse signal and derivatives of the pulse signal.

As mentioned above, various embodiments of the systems and methods described in accordance with the teachings herein may analyze the derivatives of the pulse signal to identify subtle wave components and other signal parameters. For example, the first derivative 510 and the second derivative 520 may be used to identify the dicrotic notch which is used in evaluating the initial orthostatic response. FIG. 5B and FIG. 5C illustrate other example plots 550, 580 of pulse signals 555, 585 with variations in pulse shapes and the corresponding first derivative 560, 590, the second derivative 565, 595 and the third derivative 570, 600 of the pulse signals 555, 585, respectively. As shown in FIG. 5B and FIG. 5C, the dicrotic notch can be identified using the teachings herein for pulse signals with various pulse shapes.

Referring now to FIG. 6, shown therein is a plot 600 of an example initial orthostatic response curve that was determined according to the teachings herein. The plot 600 shows dicrotic notches as discrete points 602 and a smoothed initial orthostatic response curve 603 using curve fitting techniques commonly known by those skilled in the art. The smoothed initial orthostatic response curve 603 may be smoothed using polynomial smoothing methods commonly known to those skilled in the art. The plot 600 also shows a first time marker 604 corresponding to the individual standing up from a seated position during an orthostatic test, a second time marker 606 corresponding to the individual sitting down during the orthostatic test, and a third time marker 608 corresponding to the end of the orthostatic test. FIG. 6 shows how a smoothing algorithm can provide an effective way to assess orthostatic changes in a visually intuitive manner that simplifies computational analysis and the three phases of orthostatic testing that can be used. However, the third phase identified by time marker 608 may be optional.

Referring now to FIG. 7, shown therein is a screenshot of an example GUI 700 that may be displayed to a user of system 100. The GUI 700 may be an example of an orthostatic response analysis screen that can be shown to the user. The GUI 700 can display a graph corresponding to the smoothed orthostatic response trend 702 with the x-axis of the graph being time in seconds while the y-axis of the graph shows signal amplitude, allowing the user to visualize the initial orthostatic response. The graph can include visual indicators 704, 706 corresponding to a time when an individual being tested stood up during the orthostatic test and the time when the individual sat down during the orthostatic test, respectively. In this case, FIG. 7 shows an example of a results screen with a display of the orthostatic response to standing at the two minute mark and sitting down at the four minute mark. The pattern of orthostatic response illustrates how there can be initial rise after standing with a subsequent fall. There is a great variety of ways people respond to an orthostatic challenge that is affected by aging, stress, fatigue, hydration, medications and illness.

The GUI 700 can include navigational buttons such as at least one of a back button 712, an information button 716, a settings button 718, a clipboard button 714, a results button 708 and a history button 710. The various navigational buttons may be operated by a user using the user interface 18 to navigate among various GUI screens of the system 10. For example, when an input from the user is received indicating that the information button 716 was selected by the user, the GUI 700 may be used to display an explanation of the orthostatic response. As another example, when an input from the user is received indication that the clipboard button 714 was selected by the user, the GUI 700 may be used to display a notes application that allows the user to make freeform notes regarding the orthostatic test. As another example, when an input from the user is received indicating that the results button 708 button 716 was selected by the user, an orthostatic response score may be displayed using the GUI 700. Additionally, when an input from the user is received indicating that the history button 710 was selected by the user, the GUI 700 may be used to display the orthostatic score over time, for example.

Referring now to FIG. 8, shown therein is a screenshot of an example embodiment of a GUI 800 that may be presented to a user of the system 100. The GUI 800 is an example of a result page for an individual who has undergone orthostatic testing using the system 100. The GUI 800 displays a visual representation of a reading of an individual's initial orthostatic response in the form of a dial indicator 802. The needle of the dial indicator 830 can be moved according to the results of the assessment of the individual's initial orthostatic response. For example, the initial orthostatic response can be assigned a score based on at least one of the ratios calculated at steps 408 and 410, and then the dial indicator 802 can be positioned in the GUI 800 to indicate the score. The score can be indicative of the extent to which an individual's ANS recovers from an orthostatic challenge. The GUI 800 can also include navigational buttons such as at least one of a back button 812, a clipboard 814, an information button 816 and a settings button 818. When input is received indicating that the user has selected the clipboard button 814, the information button 816, the settings button 818 or the back button 812, the GUI 800 may be operated in a similar manner as discussed for the GUI 700.

One way to determine the position of the dial on the GUI 800 may be to assign the individual's initial orthostatic response to a bin as follows, where the first metric "return to baseline" is determined using the first ratio calculated at step 408 and the second metric "no fall below a certain percentage of baseline" is determined using the second ratio calculated at step 410. The bin for which the initial orthostatic response is matched, is indicated by the number that the dial of the GUI 800 is closest to with the position of the dial between adjacent bins being determined by the option (a) to (e) which is true for the orthostatic response.

Bin #1
  a. Return to baseline or above within 30 seconds of standing with no fall below 90% of baseline within the following 80 seconds
  b. Return to baseline or above within 30 seconds of standing with no fall below 85% of baseline within the following 80 seconds
  c. Return to baseline or above within 30 seconds of standing with no fall below 80% of baseline within the following 80 seconds
  d. Return to baseline or above within 30 seconds of standing with a fall below 80% of baseline within the following 80 seconds
  e. Return to baseline or above between 30 seconds and 80 seconds after standing Bin #2
  a. Return to between 90% of baseline and baseline within 30 seconds of standing with no fall below 80% of baseline within the following 80 seconds
  b. Return to 90% of baseline and baseline or above within 30 seconds of standing with no fall below 75% of baseline within the following 80 seconds
  c. Return to between 90% of baseline and baseline within 30 seconds of standing with no fall below 70% of baseline within the following 80 seconds
  d. Return to between 90% of baseline and baseline within 30 seconds of standing with a fall below 70% of baseline within the following 80 seconds
  e. Return to between 90% of baseline and baseline between 30 seconds and 80 seconds after standing Bin #3
  a. Return to between 80% of baseline and 90% of baseline within 30 seconds of standing with no fall below 70% of baseline within the following 80 seconds
  b. Return to between 80% baseline and 90% of baseline within 30 seconds of standing with no fall below 65% of baseline within the following 80 seconds
  c. Return to between 80% of baseline and 90% of baseline within 30 seconds of standing with no fall below 60% of baseline within the following 80 seconds
  d. Return to between 80% of baseline and 90% baseline within 30 seconds of standing with a fall below 60% of baseline within the following 80 seconds
  e. Return to between greater than 80% of baseline and 90% of baseline between 30 seconds and 80 seconds after standing Bin #4
  a. Return to between 75% of baseline and 80% of baseline within 30 seconds of standing with no fall below 60% of baseline within the following 80 seconds
  b. Return to between 75% baseline and 80% of baseline within 30 seconds of standing with no fall below 55% of baseline within the following 80 seconds
  c. Return to between 75% of baseline and 80% of baseline within 30 seconds of standing with no fall below 50% of baseline within the following 80 seconds
  d. Return to between 75% of baseline and 80% baseline within 30 seconds of standing with a fall below 50% of baseline within the following 80 seconds
  e. Return to between greater than 75% of baseline and 80% of baseline between 30 seconds and 80 seconds after standing Bin #5
  a. Return to between 65% of baseline and 75% of baseline within 30 seconds of standing with no fall below 55% of baseline within the following 80 seconds
  b. Return to between 65% baseline and 70% of baseline within 30 seconds of standing with no fall below 50% of baseline within the following 80 seconds
  c. Return to between 65% of baseline and 75% of baseline within 30 seconds of standing with no fall below 45% of baseline within the following 80 seconds
  d. Return to between 65% of baseline and 75% baseline within 30 seconds of standing with a fall below 45% of baseline within the following 80 seconds
  e. Return to between greater than 65% of baseline and 75% of baseline between 30 seconds and 80 seconds after standing Bin #6
  a. Return to between 55% of baseline and 65% of baseline within 30 seconds of standing with no fall below 45% of baseline within the following 80 seconds
  b. Return to between 55% baseline and 65% of baseline within 30 seconds of standing with no fall below 40% of baseline within the following 80 seconds
  c. Return to between 55% of baseline and 65% of baseline within 30 seconds of standing with no fall below 35% of baseline within the following 80 seconds
  d. Return to between 50% of baseline and 60% baseline within 30 seconds of standing with a fall below 35% of baseline within the following 80 seconds
  e. Return to between greater than 55% of baseline and 65% of baseline between 30 seconds and 80 seconds after standing Bin #7
  a. Return to greater than 45% of baseline and 55% of baseline within 30 seconds of standing with no fall below 35% of baseline within the following 80 seconds
  b. Return to between 45% baseline and 55% of baseline within 30 seconds of standing with no fall below 30% of baseline within the following 80 seconds
  c. Return to between 45% of baseline and 55% of baseline within 30 seconds of standing with no fall below 25% of baseline within the following 80 seconds
  d. Return to between 45% of baseline and 55% baseline within 30 seconds of standing with a fall below 25% of baseline within the following 80 seconds e. Return to between greater than 45% and 55% of baseline between 30 seconds and 80 seconds after standing Bin #8
a. Return to between 35% of baseline and 45% of baseline within 30 seconds of standing with no fall below 25% of baseline within the following 80 seconds
b. Return to between 35% baseline and 45% of baseline within 30 seconds of standing with no fall below 20% of baseline within the following 80 seconds
c. Return to between 35% of baseline and 45% of baseline within 30 seconds of standing with no fall below 15% of baseline within the following 80 seconds
d. Return to between 35% of baseline and 45% baseline within 30 seconds of standing with a fall below 15% of baseline within the following 80 seconds
e. Return to between greater than 35% and 45% of baseline between 30 seconds and 80 seconds after standing Bin #9
a. Return to between 25% of baseline and 35% of baseline within 30 seconds of standing with no fall below 15% of baseline within the following 80 seconds
b. Return to between 25% baseline and 35% of baseline within 30 seconds of standing with no fall below 10% of baseline within the following 80 seconds
c. Return to between 25% of baseline and 35% of baseline within 30 seconds of standing with a fall to below 5% of baseline within 30 seconds of standing
d. Return to less than 25% of baseline within 35 seconds of standing
e. Return to between greater than 25% and 35% of baseline between 30 seconds and 80 seconds after standing Bin #10
a. Return to between 20% of baseline and 25% of baseline within 80 seconds of standing
b. Return to between 15% baseline and 20% of baseline within 80 seconds of standing with no fall below 5% of baseline within the following 80 seconds
c. Return to between 10% of baseline and 15% of baseline within 80 seconds of standing
d. Return to between 5% of baseline and 10% of baseline within 80 seconds of standing
e. Return to less than 5% of baseline within 80 seconds of standing The bin number may be displayed along with the dial indicator 802. Alternatively, the bin number can correspond to divisions on the dial indicator 802 and may provide the user with an estimate of the user's score.

Figure 9:
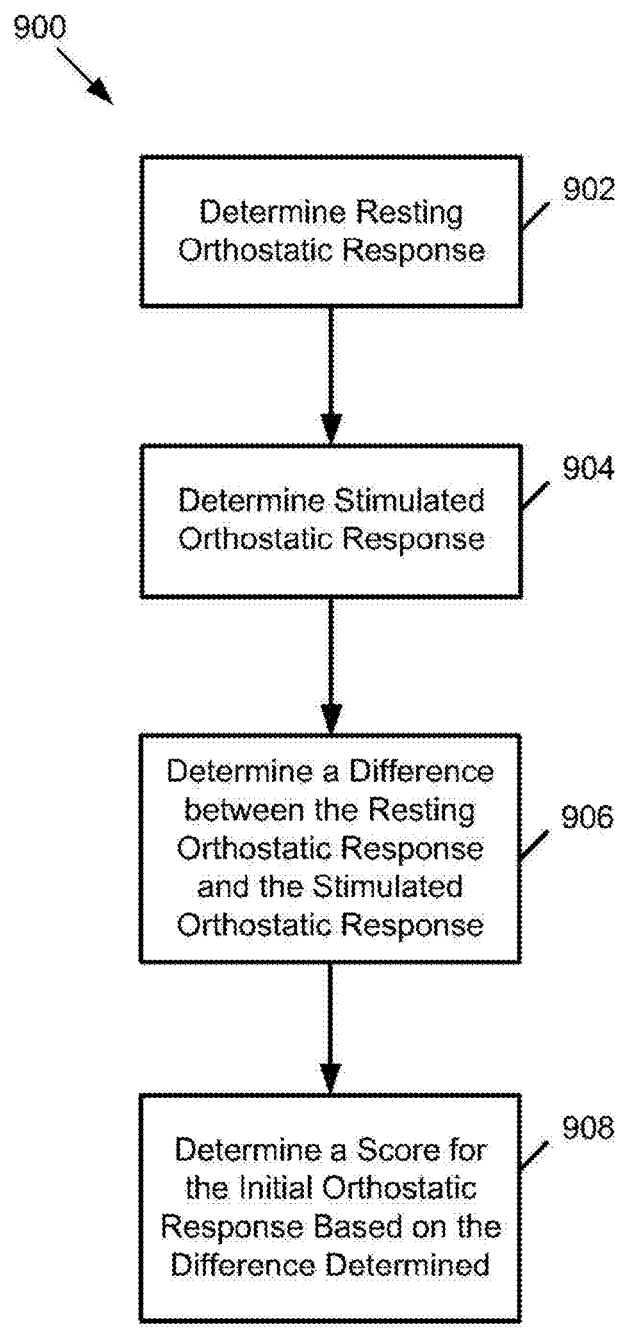
FIG. 9 is a flowchart of part of another example embodiment of a method for evaluating an initial orthostatic response.

Referring now to FIG. 9, shown therein is a flowchart of an example embodiment of a method 900 for analyzing and evaluating an initial orthostatic response of an individual, which may be used to determine the initial orthostatic response test results. The method 900 may be used in combination with at least some steps of method 200 and/or method 300. For example, the method 900 may be performed to implement step 208 of method 200. The method 900 may be used as an alternative or in addition to method 400. The method 900 can be performed by processor(s) of the processing unit 104 when executing software instructions of the various modules including the orthostatic application 126 described earlier.

At step 902, the method 900 involves determining a resting orthostatic response of the individual. For example, step 902 can involve analyzing a first portion of the initial orthostatic response curve, obtained at, for example step 206 of method 200 and extrapolating the results of the analysis over a longer period of time, for example, the length of the orthostatic test. In some cases, the first portion of the initial orthostatic response curve may be parsed to determine the average height of the orthostatic response curve over a first time window in the first portion of the orthostatic response curve. For example, the standard deviation of the height of the orthostatic response curve may be determined for multiple fixed length time windows (e.g., 10 seconds) and the first time window may correspond to the time window having the smallest standard deviation. The resting orthostatic response of the individual can correspond to the orthostatic of response of the individual during a window of time when the individual is sitting down and can correspond to the pre-test sitting period. The resting orthostatic response may be analogous to the baseline of method 400. As described above, the pre-test sitting period is preferably sufficiently long to allow the individual's blood pressure to settle to a stable baseline value, for example, between 30 seconds and 2 minutes or more. The resting orthostatic response may be represented as a resting orthostatic response curve. For example, the value corresponding to the average height of the orthostatic response curve over the first time window (i.e., the resting orthostatic value) may be represented as a constant function over a pre-determined period of time, for example, the length of time over which the stimulated orthostatic response is determined.

At step 904, the method 900 involves determining a stimulated orthostatic response of the individual. The stimulated orthostatic response corresponds to the orthostatic response of the individual when a stimulus is applied to the cardiovascular system of the individual. For example, the stimulus may correspond to standing up from a sitting position during an orthostatic test, as described above. Step 902 can involve analyzing a second portion of the initial orthostatic response curve, for example, the orthostatic response curve obtained at step 206 of method 200 and can involve obtaining a stimulated response curve. The second portion of the initial orthostatic response curve can correspond to a second time window, occurring after the first time window. The second portion of the initial orthostatic response curve may occur immediately after the first portion of the initial orthostatic response curve that was analyzed at 902, can correspond to a window of time occurring immediately after the individual has stood up from the sitting position and/or can include a window of time when the individual has returned to a sitting position after standing up. As described, the second time window may be in the range of about 30 seconds to about 10 minutes in length. The stimulated orthostatic response obtained may be normalized. For example, the stimulated orthostatic response and the resting orthostatic response may be assigned values on a scale, for example, from 0 to 1, where 1 corresponds to the resting orthostatic response. Normalizing the stimulated orthostatic response and the resting orthostatic response can allow stimulated orthostatic responses obtained from multiple orthostatic tests associated with different resting orthostatic responses to be compared.

At step 906, the method 900 involves determining a difference between the resting orthostatic response and the stimulated orthostatic response. For example, step 906 can involve subtracting a stimulus value (from the stimulated orthostatic response) from an initial value or resting value (from the extrapolated resting orthostatic response) (e.g., the resting orthostatic value). Alternatively, step 906 can involve subtracting the stimulated orthostatic response curve from the resting orthostatic response curve to obtain a difference curve.

At step 908, the method 900 involves determining an orthostatic response score based on the difference calculated at step 906. In at least one embodiment, the orthostatic response score may be expressed as a percentage. In at least one embodiment, the score may be calculated by determining the sum of N points located on the difference curve and comparing the sum to the resting orthostatic response, for example by dividing the sum by the resting orthostatic value multiplied by N. The number of points N used may be determined based on the individual's heart rate. For example, each point may correspond to a heartbeat and the number of points may correspond to the number of heartbeats within the time window over which the orthostatic response is evaluated.

A score tending towards zero (or 0%) is indicative of a poor orthostatic response while a score tending towards one (or 100%) is indicative of a good orthostatic response. A score tending towards zero (or 0%) indicates a fall in blood pressure of the individual when the stimulus is applied, with no return to resting orthostatic response while a score tending towards one (or 100%) indicates that the blood pressure of the individual can recover to or near the resting orthostatic response in a short period of time following the application of the stimulus.

In at least one embodiment, the resting orthostatic response curve and/or the stimulated orthostatic response curve may be displayed, for example, on display 106, to allow the user to visualize the individual's initial orthostatic response. Displaying the resting orthostatic response curve and the stimulated orthostatic response curve can allow the user to visualize the amplitude of the response (i.e., how well the individual's ANS recovers) and the speed of the response (i.e., how fast the individual's ANS recovers).

Figure 10A:
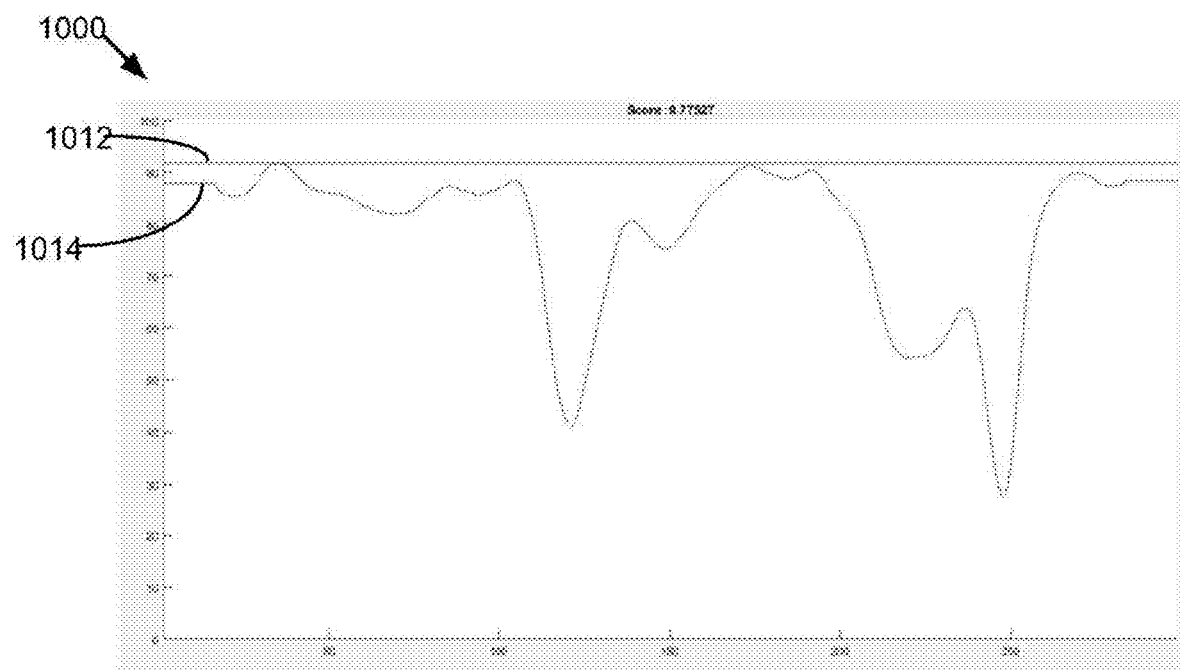
FIG. 10A illustrates a plot of an example resting orthostatic response curve and stimulated orthostatic response curve.
Figure 10B:
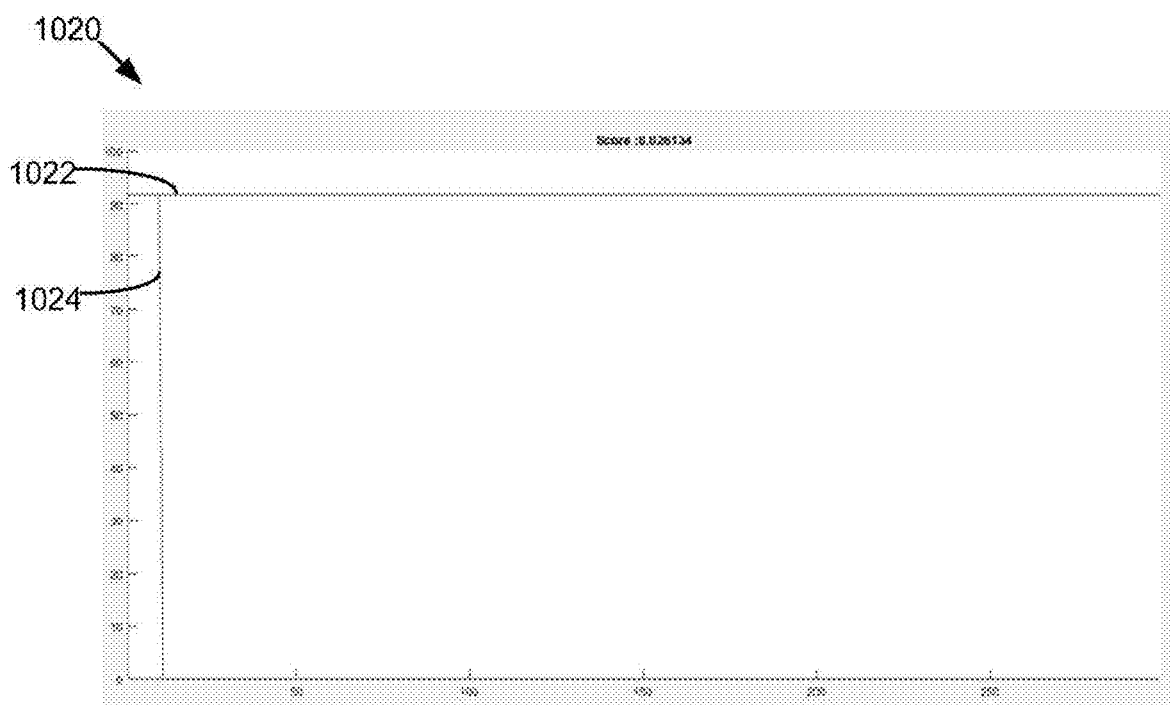
FIG. 10B illustrates a plot of another example resting orthostatic response curve and stimulated orthostatic response curve.
Figure 10C:
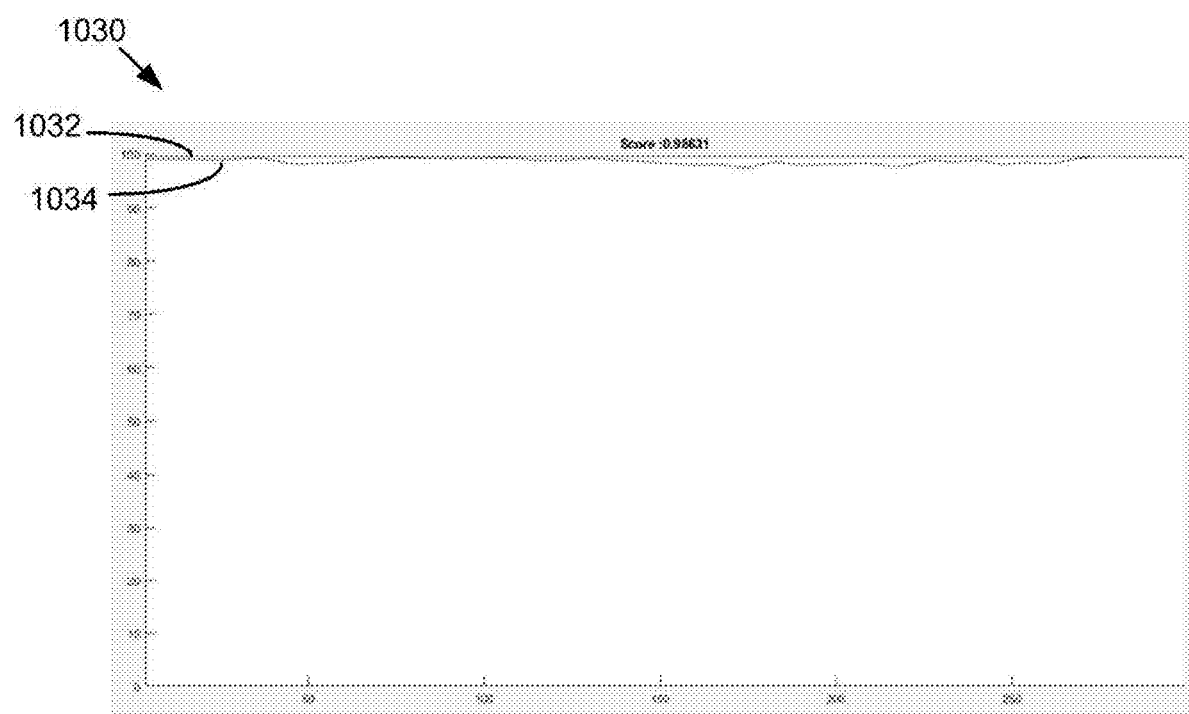
FIG. 10C illustrates a plot of another example resting orthostatic response curve and stimulated orthostatic response curve.

Referring now to FIGS. 10A-10C, shown therein are diagrams illustrating example plots 1000, 1020, and 1030, showing resting orthostatic response curves 1012, 1022 and 1032, respectively and stimulated orthostatic response curves 1014, 1024 and 1034, respectively. Plot 1000 corresponds to a typical initial orthostatic response and is associated with a score of approximately 0.775. Plot 1020 corresponds to a worst theoretical initial orthostatic response and is associated with a low score of approximately 0.026 and plot 1030 corresponds to a best theoretical orthostatic response and is associated with a high score of approximately 0.986. As shown in plot 1020, when a stimulus is applied, the stimulated orthostatic response curve 1024 drops and does not recover to the resting orthostatic response curve 1022, indicative of a poor initial orthostatic response. By contrast, for the example where a stimulus is applied, the stimulated orthostatic response curve 1034 of plot 1030 experiences minimal drop and shortly recovers to the resting orthostatic response curve 1032, indicative of a good initial orthostatic response.

While the applicant's teachings described herein are in conjunction with various embodiments for illustrative purposes, it is not intended that the applicant's teachings be limited to such embodiments. On the contrary, the applicant's teachings described and illustrated herein encompass various alternatives, modifications, and equivalents, without generally departing from the embodiments described herein. For example, while the teachings described and shown herein may comprise certain elements/components and steps, modifications may be made as is known to those skilled in the art. For example, selected features from one or more of the example embodiments described herein in accordance with the teachings herein may be combined to create alternative embodiments that are not explicitly described. All values and sub-ranges within disclosed ranges are also disclosed. The subject matter described herein intends to cover and embrace all suitable changes in technology.

The invention claimed is:

1. A method for evaluating an initial orthostatic response of an individual during an orthostatic test, the method comprising:
   receiving a pulse signal obtained during the orthostatic test performed from a sensor placed on the individual;
   identifying a position and an amplitude of a dicrotic notch for pulses in a portion of the pulse signal to obtain a set of dicrotic notch positions and amplitudes;
   generating an initial orthostatic response curve from the set of dicrotic notch positions and amplitudes;
   evaluating the initial orthostatic response curve to obtain an assessment of the initial orthostatic response; and
   displaying, storing and/or transmitting at least one of the initial orthostatic response curve and a visual representation of the assessment of the initial orthostatic response curve.

2. The method of claim 1, wherein identifying the position and the amplitude of the dicrotic notch for a given pulse in a portion of the pulse signal comprises:
   determining a first derivative and a second derivative for the given pulse;
   identifying a peak of the first derivative occurring at a first time within a search window using the first derivative;
   identifying a peak of the second derivative occurring at a second time that is later than the first time within the search window;
   measuring a height of the pulse signal at the second time where the second time is the position of the dicrotic notch; and
   normalizing the height of the dicrotic notch where the normalized height is the amplitude of the dicrotic notch.

3. The method of claim 2, wherein normalizing the height of the dicrotic notch comprises:
   identifying a minimum of the pulse signal occurring at a third time that is earlier than the first time within the search window;
   measuring a height of the pulse signal at the third time to obtain a pulse onset value;
   identifying a maximum signal value of the pulse signal occurring at a fourth time that is later than the third time and earlier than the first time within the search window and measuring the height of the pulse signal at the fourth time; and
   determining a normalized height of the dicrotic notch based on the pulse onset value and the maximum signal value.

4. The method of claim 1, wherein evaluating the initial orthostatic response curve comprises:
   parsing a first portion of the initial orthostatic response curve to measure an average height of the initial orthostatic response curve;
   parsing a second portion of the initial orthostatic response curve occurring after the first portion to identify a maximum within the second portion; and
   determining a first ratio of the maximum to the average.

5. The method of claim 4, wherein evaluating the initial orthostatic response curve further comprises:

parsing a third portion of the initial orthostatic response curve occurring after the second portion to identify a minimum within the third portion; and determining a second ratio of the minimum to the average.

6. The method of claim 2, wherein the search window corresponds to 60% of the given pulse.

7. The method of claim 5, wherein the method further comprises assigning a numerical score for the assessment of the initial orthostatic response of the individual based on at least one of the first ratio and the second ratio.

8. The method of claim 7, wherein the method further comprises assigning the assessment of the initial orthostatic response of the individual to a category based on the numerical score.

9. The method of claim 7, wherein the method further comprises assigning the individual a numerical score indicating the initial orthostatic response based on a first metric indicating an amount of time for the initial orthostatic response curve to return to baseline and a second metric indicating an amplitude of a fall below a percentage of baseline.

10. The method of claim 7, wherein displaying the visual representation of the assessment of the initial orthostatic response comprises indicating the numerical score using a dial indicator.

11. The method of claim 1, wherein evaluating the initial orthostatic response curve comprises:
determining a resting orthostatic response curve;
determining a stimulated orthostatic response curve corresponding to the initial orthostatic response of the individual when a stimulus is applied to the individual;
determining a difference between the resting orthostatic response curve and the stimulated orthostatic response curve; and
determining a score based on the determined difference for the assessment of the initial orthostatic response.

12. The method of claim 11, wherein determining the resting orthostatic response curve comprises:
parsing a first portion of the initial orthostatic response curve;
determining a resting orthostatic value representative of the first portion of the initial orthostatic response curve; and
extrapolating the resting orthostatic value.

13. The method of claim 12, wherein determining the score comprises:
summing a corresponding value of N points on the stimulated orthostatic response curve; and
determining a ratio of the sum relative to the resting orthostatic value.

14. The method of claim 1, wherein the pulse signal is obtained by measuring one of: a photoplethysmogram (PPG) signal, a tonometry signal, a piezoelectric sensor signal, a capacitive sensor signal and a pressure pulse signal.

15. A computer readable medium having stored thereon a plurality of instructions that are executable on a processor of an electronic device for configuring the electronic device to implement a method for evaluating an initial orthostatic response of an individual, wherein the method is defined according to claim 1.

16. An electronic device for evaluating an initial orthostatic response of an individual during an orthostatic test wherein the electronic device comprises:
memory for storing software instructions for evaluating the initial orthostatic response; and
a processing unit that is operatively coupled to the memory for accessing the software instructions, the processing unit being configured to, when executing the software instructions:
receive a pulse signal obtained during the orthostatic test performed from a sensor placed on the individual;
identify a position and an amplitude of a dicrotic notch for pulses in a portion of the pulse signal to obtain a set of dicrotic notch positions and amplitudes;
generate an initial orthostatic response curve from the set of dicrotic notch positions and amplitudes;
evaluate the initial orthostatic response curve to obtain an assessment of the initial orthostatic response; and
display, store and/or transmit at least one of the initial orthostatic response curve and a visual representation of the assessment of the initial orthostatic response curve.

17. The electronic device of claim 16, wherein the processing unit is further configured to assign the individual a numerical score indicating the initial orthostatic response based on a first metric indicating an amount of time for the initial orthostatic response curve to return to baseline and a second metric indicating an amplitude of a fall below a percentage of baseline.

18. The electronic device of claim 17, wherein the processing unit is further configured to assign the assessment of the initial orthostatic response of the individual to a category based on the numerical score.

19. The electronic device of claim 16, wherein evaluating the initial orthostatic response curve comprises:
determining a resting orthostatic response curve based on the initial orthostatic response curve;
determining a stimulated orthostatic response curve corresponding to the initial orthostatic response of the individual when a stimulus is applied to the individual, based on the initial orthostatic response curve;
determining a difference between the resting orthostatic response curve and the stimulated orthostatic response curve; and
determining a score based on the determined difference for the assessment of the initial orthostatic response.

20. A system for evaluating an initial orthostatic response of an individual during an orthostatic test, the system comprising:
a sensor unit that is configured to measure pulse signals from the individual;
a data acquisition unit that is coupled to the sensor unit for acquiring the measured pulse signals; and
an electronic device that is defined according to claim 16.

* * * * *